United States Patent
Xiong et al.

(10) Patent No.: US 9,820,341 B2
(45) Date of Patent: Nov. 14, 2017

(54) LED TUBE LAMP HAVING MODE SWITCHING CIRCUIT AND AUXILIARY POWER MODULE

(71) Applicant: JIAXING SUPER LIGHTING ELECTRIC APPLIANCE CO., LTD, Jiaxing (CN)

(72) Inventors: Aiming Xiong, Jiaxing (CN); Xintong Liu, Jiaxing (CN)

(73) Assignee: Jiaxing Super Lighting Electric Appliance Co., Ltd., Jiaxing, Zhejiang (CN)

(*) Notice: Subject to any disclaimer, the term of this patent is extended or adjusted under 35 U.S.C. 154(b) by 0 days.

(21) Appl. No.: 15/190,626

(22) Filed: Jun. 23, 2016

(65) Prior Publication Data

US 2016/0309550 A1    Oct. 20, 2016

Related U.S. Application Data

(63) Continuation-in-part of application No. 15/055,630, filed on Feb. 28, 2016.

(30) Foreign Application Priority Data

Mar. 10, 2015   (CN) .......................... 2015 1 0104823
Mar. 25, 2015   (CN) .......................... 2015 1 0133689

(Continued)

(51) Int. Cl.
*H05B 33/08*     (2006.01)
*F21K 9/278*     (2016.01)

(Continued)

(52) U.S. Cl.
CPC ......... *H05B 33/0803* (2013.01); *F21K 9/278* (2016.08); *H05B 33/0809* (2013.01);
(Continued)

(58) Field of Classification Search
None
See application file for complete search history.

(56) References Cited

U.S. PATENT DOCUMENTS 7,380,961 B2    6/2008   Moriyama
8,749,167 B2    6/2014   Hsia et al.
(Continued)

FOREIGN PATENT DOCUMENTS

CN    200965185    10/2007
CN    101715265    5/2010
(Continued)

*Primary Examiner* — Jany Richardson
(74) *Attorney, Agent, or Firm* — Muir Patent Law, PLLC

(57) ABSTRACT

An LED tube lamp includes a lamp tube receiving an external driving signal; a rectifying circuit rectifying the external driving signal to produce a rectified signal; a filtering circuit filtering the rectified signal to produce a filtered signal; an LED lighting module comprising a driving circuit and an LED module, the driving circuit, in a first driving mode, receiving the filtered signal to produce a first driving signal for driving the LED module to emit light; and a mode switching circuit receiving the filtered signal as a second driving signal in a second driving mode for driving the LED module to emit light. Wherein, the first driving mode and the second driving mode are determined based on the external driving signal.

33 Claims, 15 Drawing Sheets

(30) Foreign Application Priority Data

| Mar. 26, 2015 | (CN) | 2015 1 0134586 |
| Apr. 14, 2015 | (CN) | 2015 1 0173861 |
| Apr. 22, 2015 | (CN) | 2015 1 0193980 |
| May 19, 2015 | (CN) | 2015 1 0259151 |
| May 29, 2015 | (CN) | 2015 1 0284720 |
| Jun. 10, 2015 | (CN) | 2015 1 0315636 |
| Jun. 12, 2015 | (CN) | 2015 1 0324394 |
| Jun. 17, 2015 | (CN) | 2015 1 0338027 |
| Jun. 26, 2015 | (CN) | 2015 1 0372375 |
| Jun. 26, 2015 | (CN) | 2015 1 0373492 |
| Jul. 10, 2015 | (CN) | 2015 1 0406595 |
| Jul. 27, 2015 | (CN) | 2015 1 0448220 |
| Aug. 7, 2015 | (CN) | 2015 1 0482944 |
| Aug. 8, 2015 | (CN) | 2015 1 0483475 |
| Aug. 8, 2015 | (CN) | 2015 1 0486115 |
| Aug. 14, 2015 | (CN) | 2015 1 0499512 |
| Aug. 26, 2015 | (CN) | 2015 1 0530110 |
| Sep. 2, 2015 | (CN) | 2015 1 0555543 |
| Sep. 6, 2015 | (CN) | 2015 1 0557717 |
| Sep. 18, 2015 | (CN) | 2015 1 0595173 |
| Oct. 20, 2015 | (CN) | 2015 1 0680883 |
| Oct. 29, 2015 | (CN) | 2015 1 0724263 |
| Jan. 26, 2016 | (CN) | 2016 1 0050944 |

(51) Int. Cl.
    *F21V 15/015* (2006.01)
    *F21Y 103/10* (2016.01)
    *F21Y 115/10* (2016.01)
    *F21V 23/00* (2015.01)

(52) U.S. Cl.
    CPC ..... *H05B 33/0818* (2013.01); *H05B 33/0887* (2013.01); *F21V 15/015* (2013.01); *F21V 23/006* (2013.01); *F21Y 2103/10* (2016.08); *F21Y 2115/10* (2016.08); *Y02B 20/346* (2013.01)

(56) References Cited

U.S. PATENT DOCUMENTS

| 9,497,821 | B2 | 11/2016 | Liu |
| 9,521,718 | B2* | 12/2016 | Xiong ............... H05B 33/0815 |
| 9,587,817 | B2 | 3/2017 | Liu et al. |
| 9,609,711 | B2 | 3/2017 | Jiang et al. |
| 9,689,536 | B2 | 6/2017 | Xiong et al. |
| 2002/0176262 | A1 | 11/2002 | Tripathi |
| 2003/0102819 | A1 | 6/2003 | Min |
| 2010/0102729 | A1 | 4/2010 | Katzir |
| 2011/0043127 | A1 | 2/2011 | Yamasaki |
| 2011/0148313 | A1 | 6/2011 | Ramaker |
| 2011/0228526 | A1 | 9/2011 | Hartikka et al. |
| 2011/0260614 | A1 | 10/2011 | Hartikka et al. |
| 2012/0181952 | A1 | 7/2012 | Rooer |
| 2012/0313540 | A1 | 12/2012 | Lin |
| 2013/0127327 | A1 | 5/2013 | Heil et al. |
| 2013/0147350 | A1 | 6/2013 | Yang |
| 2013/0335959 | A1 | 12/2013 | Hsia et al. |
| 2014/0035463 | A1* | 2/2014 | Miyamichi ........ H05B 33/0815 315/127 |
| 2014/0055029 | A1 | 2/2014 | Jans |
| 2014/0117853 | A1 | 5/2014 | Miyamichi |
| 2014/0239834 | A1 | 8/2014 | Choi et al. |
| 2014/0265900 | A1 | 9/2014 | Sadwick et al. |
| 2015/0077001 | A1 | 3/2015 | Takahashi |
| 2016/0081147 | A1* | 3/2016 | Guang ............... H05B 33/0803 315/123 |
| 2016/0091147 | A1* | 3/2016 | Jiang ................. H05B 33/0815 315/205 |
| 2016/0219658 | A1 | 7/2016 | Xiong et al. |
| 2016/0270163 | A1 | 9/2016 | Hu |
| 2016/0270164 | A1 | 9/2016 | Xiong et al. |
| 2016/0270165 | A1 | 9/2016 | Xiong et al. |
| 2016/0270184 | A1 | 9/2016 | Xiong et al. |
| 2017/0067627 | A1 | 3/2017 | Liu et al. |
| 2017/0094736 | A1 | 3/2017 | Xiong et al. |
| 2017/0105263 | A1 | 4/2017 | Xiong et al. |
| 2017/0159923 | A1 | 6/2017 | Liu et al. |
| 2017/0164434 | A1 | 6/2017 | Xiong et al. |

FOREIGN PATENT DOCUMENTS

| CN | 102155642 | 8/2011 |
| CN | 102355780 | 2/2012 |
| CN | 102932997 | 2/2013 |
| CN | 106015996 A | 10/2016 |
| WO | WO2013150417 A1 | 10/2013 |
| WO | WO2015028329 A1 | 3/2015 |
| WO | WO2015028639 A1 | 3/2015 |
| WO | WO2015/066566 A1 | 5/2015 |
| WO | WO2015074917 | 5/2015 |
| WO | WO2017012514 A1 | 1/2017 |

* cited by examiner

LED TUBE LAMP HAVING MODE SWITCHING CIRCUIT AND AUXILIARY POWER MODULE

RELATED APPLICATIONS

This present application is a continuation-in-part of U.S. application Ser. No. 15/055,630, filed Feb. 28, 2016 in the United States Patent and Trademark Office, the entire contents of which are incorporated herein by reference, and which claims the benefit of priority under 35 U.S.C. §119 to the following Chinese Patent Applications, filed with the State Intellectual Property Office (SIPO), the contents of each of which are incorporated herein by reference in their entirety: CN201510104823.3, filed Mar. 10, 2015; CN201510134586.5, filed Mar. 26, 2015; CN201510133689.x, filed Mar. 25, 2015; CN201510173861.4, filed Apr. 14, 2015; CN201510193980.6, filed Apr. 22, 2015; CN201510372375.5, filed Jun. 26, 2015; CN201510284720.x, filed May 29, 2015; CN201510338027.6, filed Jun. 17, 2015; CN201510315636.x, filed Jun. 10, 2015; CN201510406595.5, filed Jul. 10, 2015; CN201510486115.0, filed Aug. 8, 2015; CN201510557717.0, filed Sep. 6, 2015; CN201510595173.7, filed Sep. 18, 2015; CN201510530110.3, filed Aug. 26, 2015; CN201510680883.X, filed Oct. 20, 2015; CN201510259151.3, filed May 19, 2015; CN201510324394.0, filed Jun. 12, 2015; CN201510373492.3, filed Jun. 26, 2015; CN201510482944.1, filed Aug. 7, 2015; CN201510499512.1, filed Aug. 14, 2015; CN201510448220.5, filed Jul. 27, 2015; CN201510483475.5, filed Aug. 8, 2015; CN201510555543.4, filed Sep. 2, 2015; CN201510724263.1, filed Oct. 29, 2015; and CN201610050944.9, filed Jan. 26, 2016. In addition, the contents of Chinese Patent Application No. CN201510075925.7, filed Feb. 12, 2015, are also incorporated herein by reference in their entirety. If any terms in this application conflict with terms used in any of the applications from which this application claims priority, a construction based on the terms as used in this application should be applied.

TECHNICAL FIELD

The disclosed embodiments relate to the features of light emitting diode (LED) lighting. More particularly, the disclosed embodiments describe various improvements for LED tube lamps with a capability of selecting an appropriate mode using a mode switching circuit to improve compatibility with various types of driving systems of LED tube lamps.

BACKGROUND

Light emitting diode (LED) lighting technology is rapidly developing to replace traditional incandescent and fluorescent lightings. LED tube lamps are mercury-free in comparison with fluorescent tube lamps, which are filled with inert gas and mercury. Thus, LED tube lamps are becoming an illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a variety of LED elements and driving circuits. The LED elements include LED chip-packaging elements, light diffusion elements, high efficient heat dissipating elements, light reflective boards and light diffusing boards. Heat generated by the LED elements and the driving elements is considerable and mainly dominates the illumination intensity such that the heat dissipation is properly disposed to avoid rapid decrease of the luminance and the lifetime of the LED lamps. Thus, power loss, rapid light decay, and short lifetime due to poor heat dissipation tend to be the factors to be considered when improving the performance of the LED illuminating system.

Nowadays, most of the LED tube lamps use plastic tubes and metallic elements to dissipate heat from the LEDs. The metallic elements are usually exposed to the outside of the plastic tubes. This design improves heat dissipation but heightens the risk of electric shocks. The metallic elements may be disposed inside the plastic tubes; however, the heat still remains inside the plastic tubes and may deform the plastic tubes. Deformation of the plastic tubes may also occur even when the elements to dissipate heat from the LEDs are not metallic.

The metallic elements disposed to dissipate heat from the LEDs may be made of aluminum. However, aluminum is typically too soft to sufficiently support the plastic tubes when the deformation of plastic tubes occurs due to the heat as far as the metallic elements disposed inside the plastic tubes are concerned.

Besides, for some LED tube lamps, a rigid circuit board is typically electrically connected with end caps by way of wire bonding, in which the wires may be easily damaged or broken due to movement during manufacturing, transportation, and usage of the LED tube lamps and therefore may disable the LED tube lamps. Or, bendable circuit sheet may be used to electrically connect the LED assembly in the lamp tube and the power supply assembly in the end cap(s). Typically, the length of the lamp tube during manufacturing matches for the bendable circuit sheet, and thus the variable factor increases in the manufacture of the lamp tube.

As a result, traditional technologies may result in decreased heat conduction, poor heat dissipation, heat deformation, weak electrical connection, and variable factor in manufacture defects.

Still, circuit design of current LED tube lamps mostly doesn't provide suitable solutions for complying with relevant certification standards and for better compatibility with the driving structure using an electronic ballast originally for a fluorescent lamp. For example, since there are usually no electronic components in a fluorescent lamp, it's fairly easy for a fluorescent lamp to be certified under EMI (electromagnetic interference) standards and safety standards for lighting equipment as provided by Underwriters Laboratories (UL). However, there are a considerable number of electronic components in an LED tube lamp, and therefore consideration of the impacts caused by the layout (structure) of the electronic components is important, resulting in difficulties in complying with such standards.

Common main types of electronic ballast include instant-start ballast and program-start ballast. Electronic ballast typically includes a resonant circuit and is designed to match the loading characteristics of a fluorescent lamp in driving the fluorescent lamp. For example, for properly starting a fluorescent lamp, the electronic ballast provides driving methods respectively corresponding to the fluorescent lamp working as a capacitive device before emitting light, and working as a resistive device upon emitting light. But an LED is a nonlinear component with significantly different characteristics from a fluorescent lamp. Therefore, using an LED tube lamp with an electronic ballast may impact the resonant circuit design of the electronic ballast, which may cause a compatibility problem. Further, electronic ballast is in effect a current source, and when it acts as a power supply of a DC-to-DC converter circuit in an LED tube lamp, problems of overvoltage and overcurrent or undervoltage and undercurrent are likely to occur, resulting in damaging of electronic components in the LED tube lamp or unstable provision of lighting by the LED tube lamp.

Further, the driving of an LED uses a DC driving signal, but the driving signal for a fluorescent lamp is a low-frequency, low-voltage AC signal as provided by an AC powerline, a high-frequency, high-voltage AC signal provided by a ballast, or even a DC signal provided by a battery for emergency lighting applications. Since the voltages and frequency spectrums of these types of signals differ significantly, simply performing a rectification to produce the required DC driving signal in an LED tube lamp may not achieve the LED tube lamp's compatibility with traditional driving systems of a fluorescent lamp.

Currently, LED tube lamps used to replace traditional fluorescent lighting devices can be primarily categorized into two types. One is for ballast-compatible LED tube lamps, e.g., T-LED lamp, which directly replaces fluorescent tube lamps without changing any circuit on the lighting device; and the other one is for ballast by-pass LED tube lamps, which omit traditional ballast on their circuit and directly connect the commercial electricity to the LED tube lamp. The latter LED tube lamp is suitable for the new surroundings in fixtures with new driving circuits and LED tube lamps.

Accordingly, there is a desire to make the power supply components of LED lights be able to select the appropriate mode for different applications of environment or driving system to improve the compatibility with various types of driving systems of LED lights.

SUMMARY

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and may be described with respect to the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "present invention" can be combined in different manners to form an LED tube lamp or a portion thereof.

The present disclosure provides a novel LED tube lamp, and aspects thereof. According to certain embodiments, a light-emitting diode (LED) tube lamp includes: a lamp tube, configured to receive an external driving signal; a rectifying circuit, configured to rectify the external driving signal to produce a rectified signal; a filtering circuit, configured to filter the rectified signal to produce a filtered signal; an LED lighting module, comprising a driving circuit and an LED module, the driving circuit configured to receive the filtered signal in a first driving mode to produce a first driving signal for driving the LED module to emit light; and a mode switching circuit, configured to receive the filtered signal as a second driving signal in a second driving mode for driving the LED module to emit light, wherein the first driving mode and the second driving mode are determined according to the external driving signal.

In some embodiments, the LED tube lamp is configured to enter the first driving mode when a frequency of the external driving signal is lower than a threshold amount, and the LED tube lamp is configured to enter the second driving mode when the frequency of the external driving signal is higher than the threshold amount.

In some embodiments, the threshold amount is a predefined mode switching frequency of 60 Hz.

In some embodiments, the threshold amount is a predefined mode switching frequency of 10 kHz.

In some embodiments, the external driving signal includes a voltage difference between a first voltage level and a second voltage level.

In some embodiments, the mode switching circuit includes a mode switch including a single pole double throw switch and/or an electronic switch.

In some embodiments, the mode switching circuit includes two mode switches, each of which includes a single pole double throw switch and/or an electronic switch.

In some embodiments, the mode switching circuit is on a printed circuit board and is electrically connected to the LED module on a bendable circuit sheet in the LED tube lamp, wherein the bendable circuit sheet is disposed below the printed circuit board to be electrically connected to the printed circuit board by soldering.

In some embodiments, the bendable circuit sheet includes a first surface and a second surface; a plurality of first soldering pads are formed on the first surface of the bendable circuit sheet; the printed circuit board includes a top surface and a bottom surface; a plurality of second soldering pads are formed on the top surface of the printed circuit board; a plurality of third soldering pads respectively corresponding to the plurality of second soldering pads are formed on the bottom surface of the printed circuit board; and the plurality of first soldering pads on the first surface of the bendable circuit sheet are electrically connected to the plurality of third soldering pads on the bottom surface of the printed circuit board by soldering.

In some embodiments, the printed circuit board further includes a plurality of through holes correspondingly passing through the plurality of second and third soldering pads on the top surface and the bottom surface of the printed circuit board, wherein at least one of the plurality of through holes is filled with a soldering material to electrically connect to the bendable circuit sheet with the second and third soldering pads during a soldering process.

In some embodiments, the bendable circuit sheet further includes at least one notch disposed on an edge of an end of the bendable circuit sheet, the at least notch aligned with the at least one of the plurality of through holes and soldered to the printed circuit board.

In some embodiments, a mode switching circuit configured to change a signal path in a light-emitting diode (LED) tube lamp, the mode switching circuit includes: at least one switch, configured to receive a filtered signal as a driving signal to drive an LED module in the LED tube lamp to emit light, and when a frequency of an external driving signal received by the LED tube lamp is higher than a predefined mode switching frequency, output the driving signal to the LED module.

In some embodiments, the predefined mode switching frequency is lower than 10 kHz.

In some embodiments, the predefined mode switching frequency is 60 Hz or higher.

In some embodiments, the at least one switch is further configured to cause a driving circuit in the LED tube lamp to receive the filtered signal and to produce another driving signal to drive the LED module to emit light when the frequency of the external driving signal received by the LED tube lamp is lower than the predefined mode switching frequency.

In some embodiments, the predefined mode switching frequency is higher than 60 Hz.

In some embodiments, the predefined mode switching frequency is lower than 10 KHz.

In some embodiments, the external driving signal includes a voltage difference between a first voltage level and a second voltage level.

In some embodiments, the signal path includes a first path extending from the external driving signal received by the LED tube lamp and including a rectifying circuit, a filtering circuit, the mode switching circuit, and the LED module.

In some embodiments, the signal path includes a second path extending from the external driving signal received by the LED tube lamp and including the rectifying circuit, the filtering circuit, the driving circuit, and the LED module.

In some embodiments, the at least one switch includes a mode switch including a single pole double throw switch and/or an electronic switch.

In some embodiments, the at least one switch includes two mode switches, each of which includes a single pole double throw switch and/or an electronic switch.

In some embodiments, the mode switching circuit is on a printed circuit board and is electrically connected to the LED module on a bendable circuit sheet in the LED tube lamp, wherein the bendable circuit sheet is disposed below the printed circuit board to be electrically connected to the printed circuit board by soldering.

In some embodiments, the bendable circuit sheet includes a first surface and a second surface; a plurality of first soldering pads are formed on the first surface of the bendable circuit sheet; the printed circuit board includes a top surface and a bottom surface; a plurality of second soldering pads are formed on the top surface of the printed circuit board; a plurality of third soldering pads respectively corresponding to the plurality of second soldering pads are formed on the bottom surface of the printed circuit board; and the plurality of first soldering pads on the first surface of the bendable circuit sheet are electrically connected to the plurality of third soldering pads on the bottom surface of the printed circuit board by soldering.

In some embodiments, the printed circuit board further includes a plurality of through holes correspondingly passing through the plurality of second and third soldering pads on the top surface and the bottom surface of the printed circuit board, wherein at least one of the plurality of through holes is filled with a soldering material to electrically connect to the bendable circuit sheet during a soldering process.

In some embodiments, the bendable circuit sheet further includes at least one notch disposed on an edge of an end of the bendable circuit sheet, the at least one notch aligned with the at least one of the plurality of through holes and soldered to the printed circuit board.

In some embodiments, a light-emitting diode (LED) tube lamp includes: a lamp tube, configured to receive an external signal; a filtering circuit, configured to filter the external signal to produce a filtered signal based on the external signal; an LED lighting module, coupled to the filtering circuit, comprising a driving circuit and an LED module; and a mode switching circuit, coupled to at least one output terminal of the filtering circuit and at least one output terminal of the driving circuit, configured to receive the filtered signal and determine whether to perform a first driving mode or a second driving mode, wherein the driving circuit is configured to, when the mode switching circuit is set to the first driving mode allowing the filtered signal to be input to the driving circuit, transform the filtered signal to output a first driving signal for driving the LED module to emit light, and wherein the filtering circuit is configured to, when the mode switching circuit is set to the second driving mode allowing the filtered signal to bypass the driving circuit, output the filtered signal as a second driving signal for driving the LED module to emit light.

In some embodiments, the driving circuit is configured to receive the filtered signal in the first driving mode to output the first driving signal when a frequency of the external driving signal received by the LED tube lamp is lower than a predefined mode switching frequency, and wherein the mode switching circuit includes at least one switch configured to receive the filtered signal in the second driving mode and to output the second driving signal when a frequency of the external driving signal received by the LED tube lamp is higher than the predefined mode switching frequency.

DETAILED DESCRIPTION OF THE EMBODIMENTS

Figure 1:
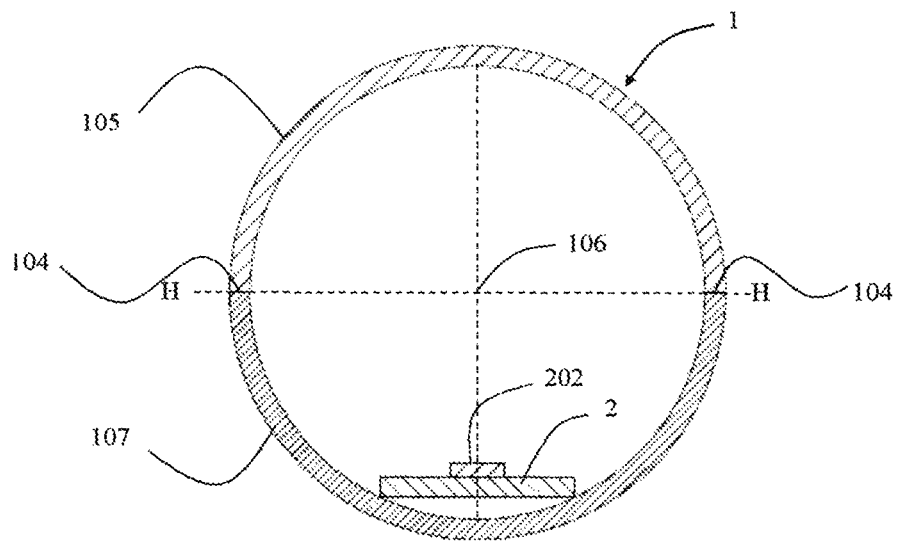
FIG. 1 is a cross-sectional view of a light emitting diode (LED) tube lamp with a light transmissive portion and a reinforcing portion in accordance with an exemplary embodiment.

The present disclosure provides a novel LED tube lamp. The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct connection (i.e., touching) unless the context indicates otherwise.

Embodiments described herein will be described referring to plane views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, resistors, etc. As such, directly electrically connected components do not include components electrically connected through active elements, such as transistors or diodes. Directly electrically connected elements may be directly physically connected and directly electrically connected.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Referring to FIG. 1, in accordance with an exemplary embodiment, the LED tube lamp includes a lamp tube 1 and an LED light assembly. The lamp tube 1 includes a light transmissive portion 105 and a reinforcing portion 107. The reinforcing portion 107 is fixedly connected to the light transmissive portion 105.

The LED light assembly is disposed inside the lamp tube 1 and includes an LED light source 202 and an LED light strip 2. The LED light source 202 is thermally and electrically connected to the LED light strip 2, which is in turn thermally connected to the reinforcing portion 107. Though only one LED light source 202 is shown, a plurality of light sources 202 may be arranged on the LED light strip 2. For example, light sources 202 may be arranged in one or more rows extending along a length direction of the LED light strip 2, which may extend along a length direction of the lamp tube 1. Heat generated by the LED light source 202 is first transmitted to the LED light strip 2 and then to the reinforcing portion 107 before egressing the lamp tube 1. Thermal connection is achieved with thermally conductive tapes or conventional mechanical fasteners such as screws aided by thermal grease to eliminate air gaps from interface areas. In certain embodiments, the LED light strip 2 may be formed from a bendable circuit sheet, for example that may be flexible. As described further below, the bendable circuit sheet, also described as a bendable circuit board, or a flexible or non-rigid tape, may be disposed on the lamp tube 1 to be bent away from the lamp tube 1, for example at longitudinal ends of the bendable circuit sheet.

Typically, the lamp tube 1 has a shape of an elongated cylinder, which is a straight structure. However, the lamp tube 1 can take any curved structure such as a ring or a horseshoe. The cross section of the lamp tube 1 is typically a circle, but may also be other shapes, such as an ellipse or a polygon. Alternatively, the cross section of the lamp tube 1 may have an irregular shape depending on the shapes of, respectively, the light transmissive portion 105 and the reinforcing portion 107 and on the manner the two portions interconnect to form the lamp tube 1.

The lamp tube 1 is a glass tube, a plastic tube or a tube made of any other suitable material or combination of materials. In some embodiments, a plastic lamp tube is made from light transmissive plastic, thermally conductive plastic or a combination of both. The light transmissive plastic may be one of translucent polymer matrices such as polymethyl methacrylate, polycarbonate, polystyrene, poly(styrene-co-methyl methacrylate) and a mixture thereof. Optionally, the strength and elasticity of thermally conductive plastic is enhanced by bonding a plastic matrix with glass fibers, such that a lamp tube employs a combination of light transmissive plastic and thermally conductive plastic. In an embodiment, an outer shell of lamp tube includes a plurality of layers made from distinct materials. For example, the lamp tube may include a plastic tube coaxially sheathed by a glass tube.

In one embodiment, the light transmissive portion 105 is made from light transmissive plastic and the reinforcing portion is 107 made from thermally conductive plastic. Injection molding may be used for producing the light transmissive portion 105 in a first piece and for producing the reinforcing portion 107 in a separate second piece. The first piece and the second piece may be configured to be clipped together, buckled together, glued together or otherwise fixedly interconnect to form the lamp tube 1. Alternatively, injection molding may be used for producing the entire lamp tube 1, which includes the light transmissive portion 105 and the reinforcing portion 107, in an integral piece of the lamp tube 1 by feeding two types of plastic materials into a molding process. In an alternative embodiment, the reinforcing portion 107 is made of metal having good thermal conductivity such as aluminum alloy and copper alloy.

Respective shapes of the light transmissive portion 105 and the reinforcing portion 107, how the two portions 105, 107 interconnect to form the lamp tube 1, and the respective proportions of the two portions 105, 107 in the lamp tube depend on one or more considerations, such as, for example, field angle, heat dissipation efficiency and structural strength. A wider field angle—potentially at the expense of heat dissipation capability and structural strength—is achieved when the proportion of the light transmissive portion 105 increases in relation to that of the reinforcing portion 107. By contrast, the lamp tube 1 benefits from an increased proportion of the reinforcing portion 107 in relation to that of the light transmissive portion 105 in such ways as better heat dissipation and rigidity but potentially loses field angle.

In some embodiments, the reinforcing portion 107 includes a plurality of protruding parts. In other embodiments, a plurality of protruding parts are disposed on the surface of the LED light strip 2 that is not covered by the LED light assembly. Like fins on a heatsink, each protruding part boosts heat dissipation by increasing the surface area of the reinforcing portion 107 and the LED light strip 2. The protruding parts are disposed equidistantly, or alternatively, not equidistantly.

Referring to FIG. 1, the lamp tube 1 illustrated in FIG. 1 has a shape of a circular cylinder. Thus, a cross section of the lamp tube 1 defines a hypothetical circle with an imaginary center 106. A line H-H divides the circle horizontally into two equal parts along a diameter of the circle. A cross section of the light transmissive portion 105 defines an upper segment on the circle. A cross section of the reinforcing portion 107 defines a lower segment on the circle. A dividing line 104 parallel to the line H-H is shared by the two segments. In the embodiment, the dividing line 104 sits exactly on the line H-H. Consequently, the area of the upper segment is the same as that of the lower segment. In one embodiment, the cross section of the light transmissive portion 105 has a same area as that of the reinforcing portion 107.

In an alternative embodiment, the dividing line 104 is spaced apart from the line H-H. For example, when the dividing line 104 is below the line H-H, the upper segment, which encompasses the light transmissive portion 105, has a greater area than the lower segment, which encompasses the reinforcing portion 107. The lamp tube 1, which includes an enlarged light transmissive portion 105, is thus configured to achieve a field angle wider than 180 degrees; however, other things equal, the lamp tube 1 surrenders some heat dissipation capability, structural strength or both due to a diminished reinforcing portion 107. By contrast, the lamp tube 1 has an enlarged reinforcing portion 107 and a diminished light transmissive portion 105 if the dividing line rises above the line H-H. Other things equal, the lamp tube 1, now having an enlarged reinforcing portion 107, is configured to exhibit higher heat dissipation capability, structural strength or both; however, the field angle of the lamp tube 1 will dwindle due to diminished dimensions of the light transmissive portion 105. In either case, the dividing line 104 may be parallel to the line H-H, or where the areas of the upper segment and lower segment are not equal, in some embodiments, rather than being parallel, the dividing line 104 may have another orientation. For example, each dividing line 104 may extend in a direction that extends radially from a center of the lamp tube 1, as viewed from a cross-section.

Figure 2:
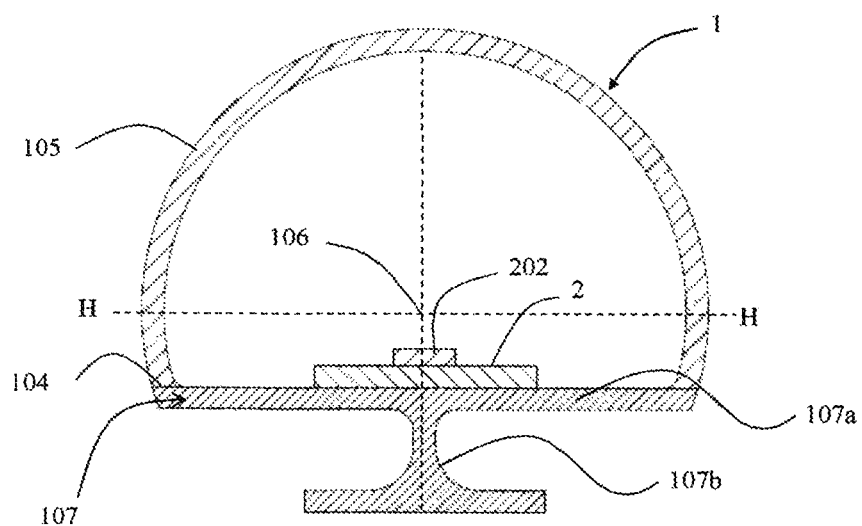
FIGS. 2, 3A, and 3B are some cross-sectional views of an LED tube lamp with a bracing structure in accordance with some exemplary embodiments.

Referring to FIG. 2, in accordance with an exemplary embodiment, the cross section of the lamp tube 1, unlike that of the cylindrical lamp tube 1 in FIG. 1, approximates an arc arranged on a flange of an I-beam. The lamp tube 1 includes a light transmissive portion 105 and a reinforcing portion 107. A cross section of the light transmissive portion 105 defines an upper segment on a hypothetical circle. A line H-H cuts the circle horizontally into two equal parts through a center 106 of the circle. The reinforcing portion 107 includes a platform 107a and a bracing structure 107b. The platform 107a has an upper surface and a lower surface. The LED light assembly, such as, for example, an LED light strip 2 and an LED light source 202, is disposed on the upper surface of the platform 107a. The bracing structure 107b is fixedly connected to the platform 107a and holds the platform 107a in place. The bracing structure 107b includes a horizontal rib, a vertical rib, a curvilinear rib or a combination of ribs selected from the above. The dimensions of the platform 107a, the horizontal rib and the vertical rib, their quantities and the manner they interconnect depend on one or more considerations, such as, for example, field angle, heat dissipation efficiency and structural strength. In the embodiment, the cross section of the reinforcing portion 107 approximates that of an I-beam. The platform 107a, the vertical rib and the horizontal rib correspond to, respectively, the upper flange, the web and the bottom flange of the I-beam. For example, the bracing structure 107b includes exactly one vertical rib and exactly one horizontal rib.

A dividing line 104 parallel to the line H-H is shared by the upper segment and the upper flange. In the embodiment, the dividing line sits below the line H-H. Consequently, the upper segment constitutes the majority of the hypothetical circle. The light transmissive portion 105 is thus configured to generate a field angle wider than 180 degrees. In an alternative embodiment, the dividing line sits on or above the line H-H. For example, when the dividing line rises above the line H-H, the upper segment, which encompasses the light transmissive portion 105, now constitutes less than half of the hypothetical circle. The lamp tube 1, which has an enlarged reinforcing portion 107, is thus configured for better heat dissipation and structural strength; however, other things equal, the lamp tube 1 loses some luminous filed due to a diminished light transmissive portion 105.

Figure 3A:
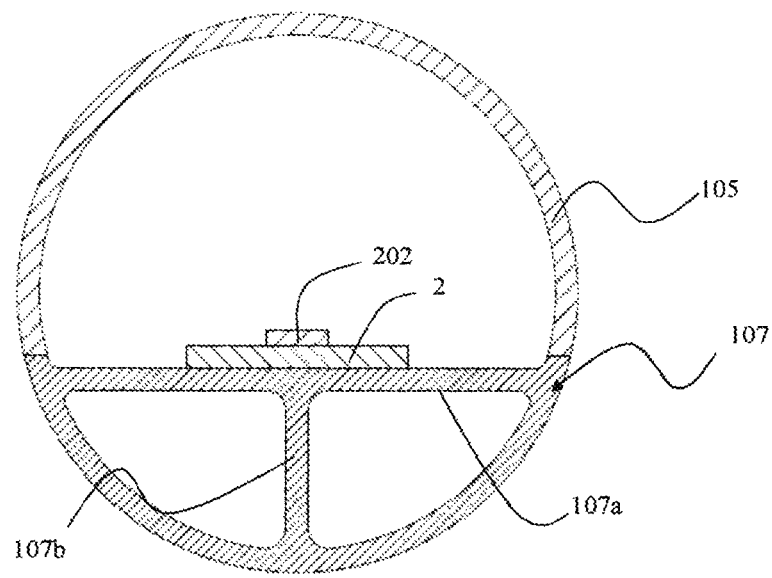

Referring to FIG. 3A, in accordance with an exemplary embodiment, a lamp tube includes a light transmissive portion 105 and a reinforcing portion 107 having a platform 107a and a bracing structure 107b. The bracing structure 107b includes a vertical rib and a curvilinear rib but no horizontal rib. A cross section of the lamp tube defines a hypothetical circle, the light transmissive portion 105 and the curvilinear rib define an upper arc on the circle and a lower arc on the circle, correspondingly. A cross section of the platform 107a and the vertical rib approximates that of a hypothetical T-beam. All three ends of the T-beam sit on the lower arc. The ratio of the length of the vertical rib to the diameter of the lamp tube depends on one or more considerations, such as, for example, field angle, heatsinking efficiency and structural strength. In some embodiments, the ratio is from 1:1.2 to 1:30. In still other embodiments, the ratio is from 1:3 to 1:10. Similarly, an LED light assembly includes, such as, for example, an LED light strip 2 and an LED light source 202. The LED light source 202 is thermally and electrically connected to the LED light strip 2, which is in turn thermally connected to the reinforcing portion 107, such as the upper surface of the platform 107a. In some embodiments, the vertical rib are not connected to the platform 107a, for example, an upper end of the vertical rib is apart from a lower surface of the platform 107a, but a lower end of the vertical rib is still connected to the curvilinear rib.

Figure 3B:
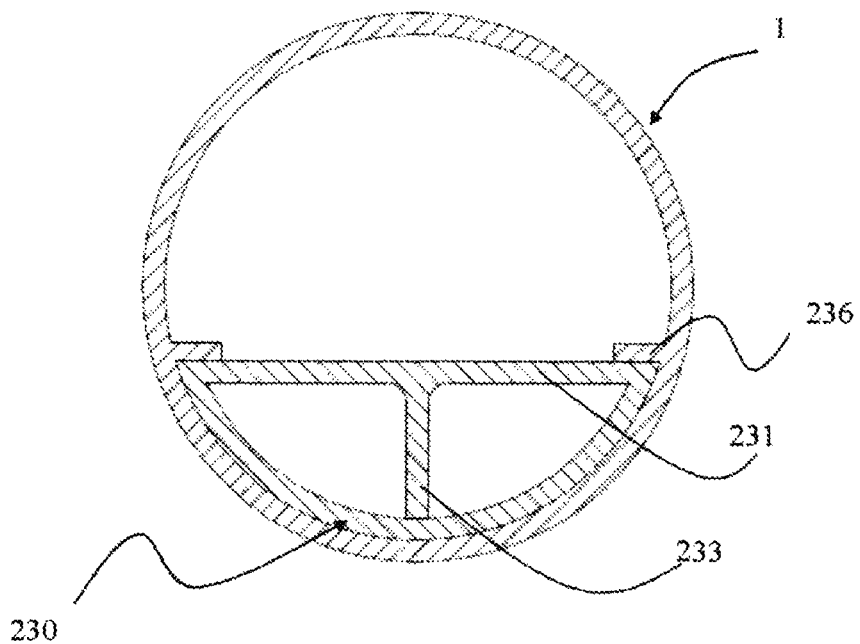

Referring to FIGS. 3B and 3A, in accordance with an exemplary embodiment, the lamp tube 1 further includes a pair of protruding bars 236. The protruding bar 236 extends in an axial direction along an inner surface of the lamp tube 1 and is configured to form a guiding channel inside the lamp tube 1. The reinforcing portion 107 is connected to the lamp tube 1 by sliding the reinforcing portion 107 into the guiding channel. In the embodiment, a cross section of an inner surface of the lamp tube 1 defines a hypothetical circle. A cross section of the curvilinear rib 230 defines a lower arc on the circle. A cross section of the platform 231 and the vertical rib 233 approximates that of a hypothetical T-beam. All three ends of the T-beam sit on the lower arc. The pair of protruding bars 236 and the inner surface of the lamp tube 1 form the guiding channel in the lamp tube 1. The cross section of the guiding channel is defined by the flange of the T-beam and the lower arc. The reinforcing portion 107 is thus configured to fit snugly into the guiding channel. In some embodiments, the vertical rib 233 are not connected to the platform 231, for example, an upper end of the vertical rib 233 is apart from a lower surface of the platform 231, but a lower end of the vertical rib 233 is still connected to the curvilinear rib 230.

In some embodiments, the circuits mentioned below may be disposed on the reinforcing portion in the lamp tube to increase the heat dissipating area and efficiency, and also to simplify the circuit design in the end cap(s). Or, some of them are kept in the end cap(s) (e.g. resistors, capacitors, the components with smaller volume or smaller power consumption, or the components generating less heat or having better heat resistant) and the others are disposed on the reinforcing portion (e.g. chips, inductors, transistors, the components with bigger volume, or the components generating much heat or having poor heat resistant) so as to increase the heat dissipating area and efficiency, and to simplify the circuit design in the end cap(s). The implementations are not limited to the disclosed embodiments.

Figure 4A:
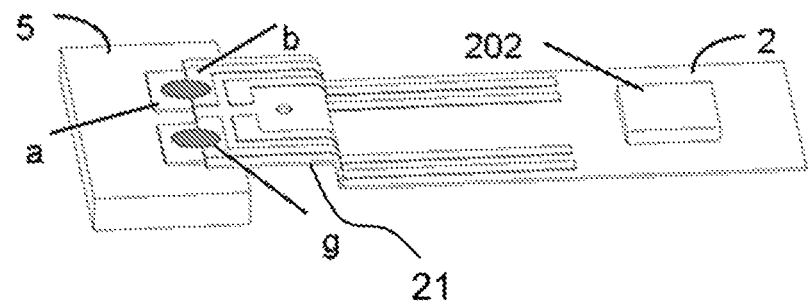
FIG. 4A is a perspective view illustrating a soldering pad on the bendable circuit sheet of the LED light strip to be joined together with the printed circuit board of the power supply in accordance with an exemplary embodiment.

Referring to FIG. 4A, an output terminal of a printed circuit board of a power supply 5 may have soldering pads "a" provided with an amount of solder (e.g., tin solder) with a thickness sufficient to later form a solder joint "g" (or a solder ball "g"). Similarly, the ends of an LED light strip 2 may have soldering pads "b". The soldering pads "a" on the output terminal of the printed circuit board are soldered to the soldering pads "b" on the LED light strip 2 via the tin solder on the soldering pads "a". The soldering pads "a" and the soldering pads "b" may be face-to-face during soldering to achieve a firm connection between the LED light strip 2 and the printed circuit board. However, with this kind of soldering, a thermo-compression head presses on the rear surface of the LED light strip 2 and heats the solder, i.e., the LED light strip 2 intervenes between the thermo-compression head and the tin solder, and therefor may cause reduced reliability. In one embodiment, a through hole may be formed in each of the soldering pads "b" on the LED light strip 2 to allow the soldering pads "b" overlay the soldering pads "a" without being face-to-face and the thermo-compression head directly presses tin solders on the soldering pads "a" on the surface of the printed circuit board when the soldering pads "a" and the soldering pads "b" are vertically aligned.

Referring again to FIG. 4A, two ends of the LED light strip 2 detached from a lamp tube are formed as freely extending portions 21, while most of the LED light strip 2 is attached and secured to the inside of the lamp tube 1. One of the freely extending portions 21 has the soldering pads "b" as mentioned above. Upon assembling of the LED tube lamp, the freely extending portions 21 along with the soldered connection of the printed circuit board of the power supply 5 and the LED light strip 2 may be coiled, curled up or deformed to be fittingly accommodated inside the lamp tube.

In this embodiment, during the connection of the LED light strip 2 and the power supply 5, the soldering pads "b" and the soldering pads "a" and the LED light sources 202 are on the surfaces facing toward the same direction and the soldering pads "b" on the LED light strip 2 are each formed with a through hole such that the soldering pads "b" and the soldering pads "a" communicate with each other via the through holes. When the freely extending portions 21 are deformed due to contraction or curling up, the soldered connection of the printed circuit board of the power supply 5 and the LED light strip 2 may exert a lateral tension on the power supply 5. Furthermore, the soldered connection of the printed circuit board of the power supply 5 and the LED light strip 2 may also exert a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes and forms a stronger and more secure electrical connection between the LED light strip 2 and the power supply 5.

As described above, the freely extending portions 21 may be different from a fixed portion of the LED light strip 2 in that the fixed portion may conform to the shape of the inner surface of the lamp tube and may be fixed thereto, while the freely extending portion 21 may have a shape that does not conform to the shape of the lamp tube. As shown in FIG. 4A, the freely extending portion 21 may be bent away from the lamp tube. For example, there may be a space between an inner surface of the lamp tube and the freely extending portion 21.

Figure 4B:
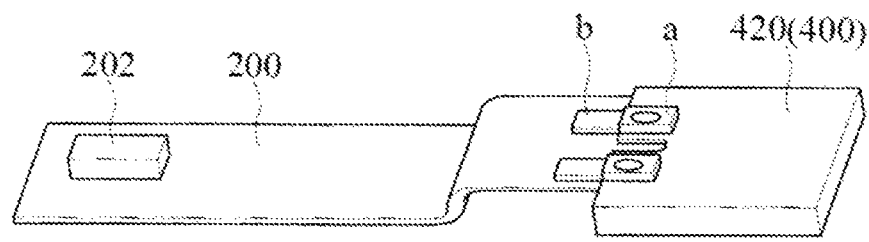
FIG. 4B is a perspective view of a bendable circuit sheet and a printed circuit board of a power supply soldered to each other in accordance with an exemplary embodiment.
Figure 4C:
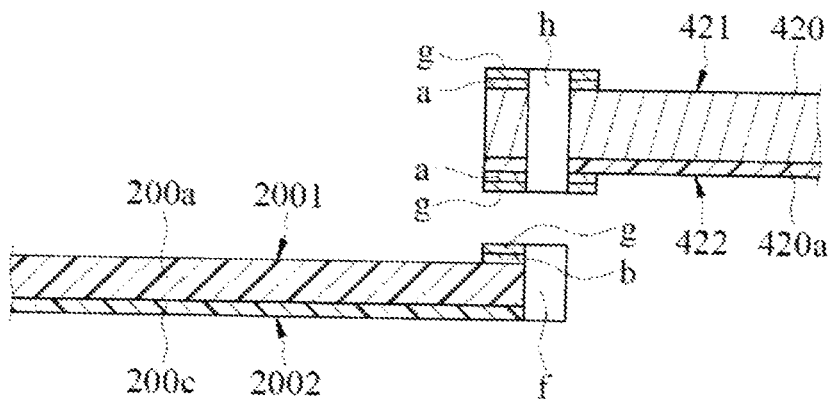
FIGS. 4C, 4D, and 4E are diagrams of a soldering process of the bendable circuit sheet and the printed circuit board of the power supply of FIG. 4B in accordance with an exemplary embodiment.
Figure 4D:
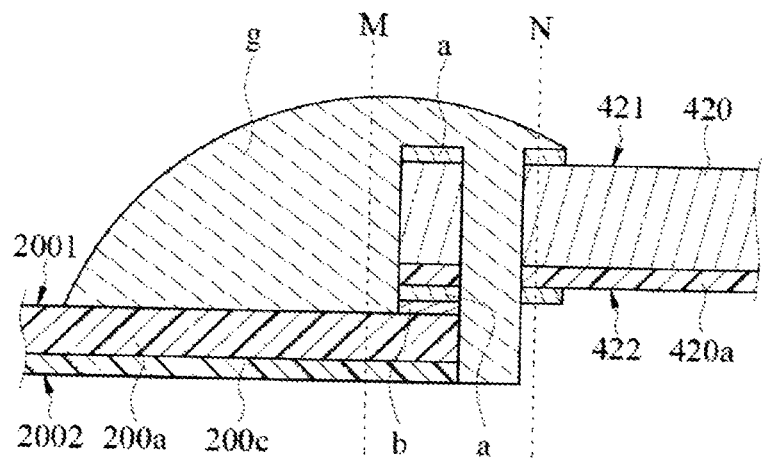
Figure 4E:
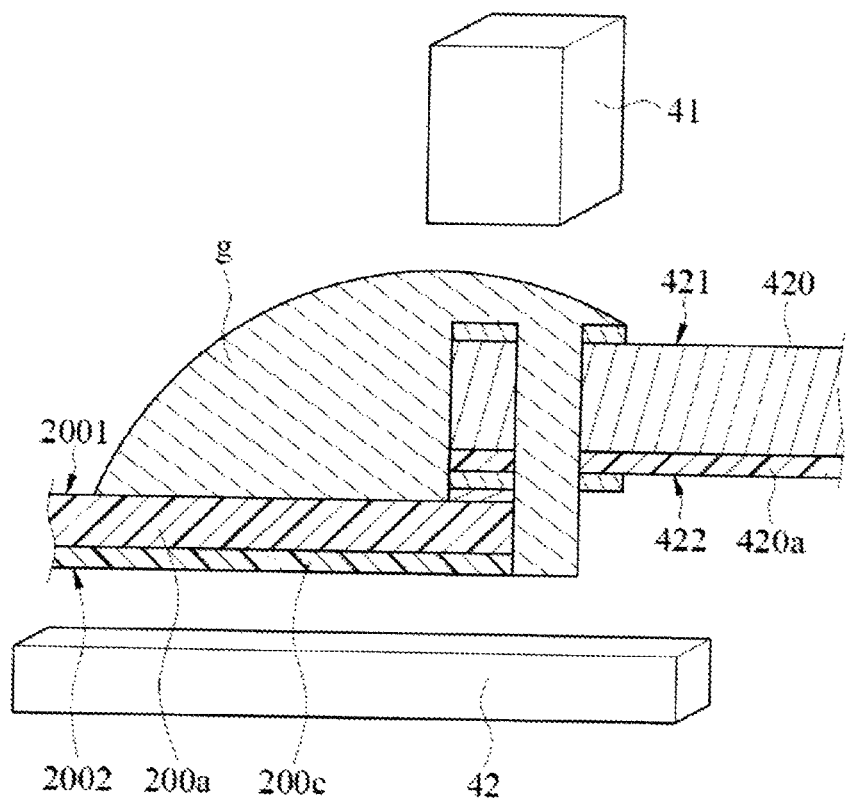

FIG. 4B is a perspective view of an exemplary bendable circuit sheet 200 and a printed circuit board 420 of a power supply 400 soldered to each other. FIG. 4C to FIG. 4E are diagrams illustrating an exemplary soldering process of the bendable circuit sheet 200 and the printed circuit board 420 of the power supply 400. In an embodiment, the bendable circuit sheet 200 and the freely extending end portion have the same structure. The freely extending end portion are the portions of two opposite ends of the bendable circuit sheet 200 and are utilized for being connected to the printed circuit board 420. The bendable circuit sheet 200 and the power supply 400 are electrically connected to each other by soldering. The bendable circuit sheet 200 comprises a circuit layer 200a and a circuit protection layer 200c over a side of the circuit layer 200a. Moreover, the bendable circuit sheet 200 comprises two opposite surfaces which are a first surface 2001 and a second surface 2002. The first surface 2001 is the one on the circuit layer 200a and away from the circuit protection layer 200c. The second surface 2002 is the other one on the circuit protection layer 200c and away from the circuit layer 200a. Several LED light sources 202 are disposed on the first surface 2001 and are electrically connected to circuits of the circuit layer 200a. The circuit protection layer 200c is made, for example, by polyimide (PI) having less thermal conductivity but being beneficial to protect the circuits. The first surface 2001 of the bendable circuit sheet 200 comprises soldering pads "b". Soldering material "g" can be placed on the soldering pads "b". In one embodiment, the bendable circuit sheet 200 further comprises a notch "f". The notch "f" is disposed on an edge of the end of the bendable circuit sheet 200 soldered to the printed circuit board 420 of the power supply 400. In some embodiments instead of a notch, a hole near the edge of the end of the bendable circuit sheet 200 may be used, which may thus provide additional contact material between the printed circuit board 420 and the bendable circuit sheet 200, thereby providing a stronger connection. The printed circuit board 420 comprises a power circuit layer 420a and soldering pads "a". Moreover, the printed circuit board 420 comprises two opposite surfaces which are a first surface (or a top surface) 421 and a second surface (or a bottom surface) 422. The second surface 422 is the one on the power circuit layer 420a. The soldering pads "a" are respectively disposed on the first surface 421 and the second surface 422. The soldering pads "a" on the first surface 421 are corresponding to those on the second surface 422. Soldering material "g" can be placed on the soldering pad "a". In one embodiment, considering the stability of soldering and the optimization of automatic process, the bendable circuit sheet 200 is disposed below the printed circuit board 420 (the direction is referred to FIG. 4C). For example, the first surface 2001 of the bendable circuit sheet 200 is connected to the second surface 422 of the printed circuit board 420. Also, as shown, the soldering material "g" can contact, cover, and be soldered to a top surface of the bendable circuit sheet 200 (e.g., first surface 2001), end side surfaces of soldering pads "a," soldering pad "b," and power circuit layer 420a formed at an edge of the printed circuit board 420, and a top surface of soldering pad "a" at the top surface 421 of the printed circuit board 420. In addition, the soldering material "g" can contact side surfaces of soldering pads "a," soldering pad "b," and power circuit layer 420a formed at a hole in the printed circuit board 420 and/or at a hole or notch in bendable circuit sheet 200. The soldering material may therefore form a bump-shaped portion covering portions of the bendable circuit sheet 200 and the printed circuit board 420, and a rod-shaped portion passing through the printed circuit board 420 and through a hole or notch in the bendable circuit sheet 200. The two portions (e.g., bump-shaped portion and rod-shaped portion) may serve as a rivet, for maintaining a strong connection between the bendable circuit sheet 200 and the printed circuit board 420.

As shown in FIG. 4D and FIG. 4E, in an exemplary soldering process of the bendable circuit sheet 200 and the printed circuit board 420, the circuit protection layer 200c of the bendable circuit sheet 200 is placed on a supporting table 42 (i.e., the second surface 2002 of the bendable circuit sheet 200 contacts the supporting table 42) in advance of soldering. The soldering pads "a" on the second surface 422 of the printed circuit board 420 contact the soldering pads "b" on the first surface 2001 of the bendable circuit sheet 200. And then a heating head 41 presses on a portion of soldering material "g" where the bendable circuit sheet 200 and the printed circuit board 420 are soldered to each other. When soldering, the soldering pads "b" on the first surface 2001 of the bendable circuit sheet 200 contact the soldering pads "a" on the second surface 422 of the printed circuit board 420, and the soldering pads "a" on the first surface 421 of the printed circuit board 420 contact the soldering material "g," which is pressed on by the heating head 41. Under the circumstance, the heat from the heating head 41 can transmit through the soldering pads "a" on the first surface 421 of the printed circuit board 420 and the soldering pads "a" on the second surface 422 of the printed circuit board 420 to the soldering pads "b" on the first surface 2001 of the bendable circuit sheet 200. The transmission of the heat between the heating heads 41 and the soldering pads "a" and "b" won't be affected by the circuit protection layer 200c which has relatively less thermal conductivity, since the circuit protection layer 200c is not between the heating head 41 and the circuit layer 200a. Consequently, the efficiency and stability regarding the connections and soldering process of the soldering pads "a" and "b" of the printed circuit board 420 and the bendable circuit sheet 200 can be improved.

As shown in the exemplary embodiment of FIG. 4D, the printed circuit board 420 and the bendable circuit sheet 200 are firmly connected to each other by the soldering material "g". Components between the virtual line M and the virtual line N of FIG. 4D from top to bottom are the soldering pads "a" on the first surface 421 of printed circuit board 420, the power circuit layer 420a, the soldering pads "a" on the second surface 422 of printed circuit board 420, the soldering pads "b" on the first surface 2001 of bendable circuit sheet 200, the circuit layer 200a of the bendable circuit sheet 200, and the circuit protection layer 200c of the bendable circuit sheet 200. The connection of the printed circuit board 420 and the bendable circuit sheet 200 are firm and stable. The soldering material "g" may extend higher than the soldering pads "a" on the first surface 421 of printed circuit board 420 and may fill in other spaces, as described above.

In other embodiments, an additional circuit protection layer (e.g., PI layer) can be disposed over the first surface 2001 of the circuit layer 200a. For example, the circuit layer 200a may be sandwiched between two circuit protection layers, and therefore the first surface 2001 of the circuit layer 200a can be protected by the circuit protection layer. A part of the circuit layer 200a (the part having the soldering pads "b") is exposed for being connected to the soldering pads "a" of the printed circuit board 420. Other parts of the circuit layer 200a are exposed by the additional circuit protection layer so they can connect to LED light sources 202. Under these circumstances, a part of the bottom of each LED light source 202 contacts the circuit protection layer on the first surface 2001 of the circuit layer 200a, and another part of the bottom of the LED light source 202 contacts the circuit layer 200a.

According to the exemplary embodiments shown in FIG. 4B to FIG. 4E, the printed circuit board 420 comprises through holes "h" passing through the soldering pads "a". In an automatic soldering process, when the heating head 41 automatically presses the printed circuit board 420, the soldering material "g" on the soldering pads "a" can be pushed into the through holes "h" by the heating head 41 accordingly. As a result, a soldered connection may be formed as shown in FIGS. 4D and 4E.

Figure 5A:
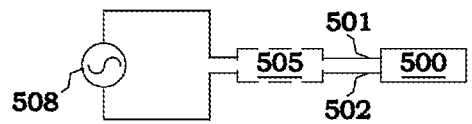
FIG. 5A is a block diagram of an exemplary power supply module in an LED lamp according to some embodiments.

FIG. 5A is a block diagram of a system including an LED tube lamp including a power supply module according to certain embodiments. Referring to FIG. 5A, an alternating current (AC) power supply 508 is used to supply an AC supply signal, and may be an AC powerline with a voltage rating, for example, in 100-277V and a frequency rating, for example, of 50 Hz or 60 Hz. A lamp driving circuit 505 receives the AC supply signal from the AC power supply 508 and then converts it into an AC driving signal. The power supply module and power supply 508 described above may include various elements for providing power to the LED light strip 2. For example, they may include power converters or other circuit elements for providing power to the LED light strip 2. In some embodiments, the power supply 508 and the lamp driving circuit 505 are outside of the LED tube lamp. For example, the lamp driving circuit 505 may be part of a lamp socket or lamp holder into which the LED tube lamp is inserted. The lamp driving circuit 505 could be an electronic ballast and may be used to convert the signal of commercial electricity into high-frequency and high-voltage AC driving signal. The common types of electronic ballast, such as instant-start electronic ballast, program-start electronic ballast, and rapid-start electronic ballast, can be applied to the LED tube lamp.

In some embodiments, the voltage of the AC driving signal is bigger than 300V and in some embodiments 400-700V with frequency being higher than 10 kHz and in some embodiments 20-50 kHz. An LED tube lamp 500 receives the AC driving signal from the lamp driving circuit 505 and is thus driven to emit light. In the present embodiment, the LED tube lamp 500 is in a driving environment in which it is power-supplied at its one end cap having two conductive pins 501 and 502, which are used to receive the AC driving signal. The two pins 501 and 502 may be electrically coupled to, either directly or indirectly, the lamp driving circuit 505. In some embodiments, the LED tube lamp is power-supplied at its both end caps respectively having two conductive pins, which are coupled to the lamp driving circuit to concurrently receive the AC driving signal. However, in certain embodiments, each end cap of the LED tube lamp could have only one conductive pin for receiving the AC driving signal. For example, it is not required to have two conductive pins used in each end cap for the purpose of passing electricity through the both ends of the LED tube lamp.

In some embodiments, the lamp driving circuit 505 may be omitted and is therefore depicted by a dotted line. In certain embodiments, if the lamp driving circuit 505 is omitted, the AC power supply 508 is directly coupled to the pins 501 and 502, which then receive the AC supply signal as the AC driving signal.

Figure 5B:
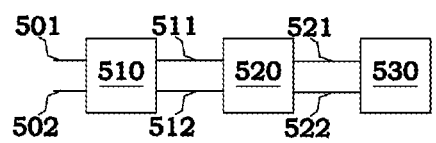
FIG. 5B is a block diagram of an exemplary LED lamp according to some embodiments.

FIG. 5B is a block diagram of an LED lamp according to one embodiment. Referring to FIG. 5B, the power supply module of the LED lamp includes a rectifying circuit 510, a filtering circuit 520, and may further include some parts of an LED lighting module 530. The rectifying circuit 510 is coupled to two pins 501 and 502 to receive and then rectify an external driving signal, so as to output a rectified signal at two rectifying output terminals 511 and 512. In some embodiments, the external driving signal may be the AC driving signal or the AC supply signal described with reference to FIG. 5A. In some embodiments, the external driving signal may be a direct current (DC) signal without altering the LED tube lamp. The filtering circuit 520 is coupled to the rectifying circuit for filtering the rectified signal to produce a filtered signal. For instance, the filtering circuit 520 is coupled to the rectifying circuit output terminals 511 and 512 to receive and then filter the rectified signal, so as to output a filtered signal at two filtering output terminals 521 and 522. The LED lighting module 530 is coupled to the filtering circuit 520 to receive the filtered signal for emitting light. For instance, the LED lighting module 530 may include a circuit coupled to the filtering output terminals 521 and 522 to receive the filtered signal and thereby to drive an LED unit (not shown) in the LED lighting module 530 to emit light. Details of these operations are described below in accordance with certain embodiments.

Although there are two rectifying output terminals 511 and 512 and two filtering output terminals 521 and 522 in the embodiments of these Figs., in practice the number of ports or terminals for coupling between the rectifying circuit 510, the filtering circuit 520, and the LED lighting module 530 may be one or more depending on the needs of signal transmission between the circuits or devices.

In addition, the power supply module of the LED lamp described in FIG. 5B, and embodiments of a power supply module of an LED lamp described below, may each be used in the LED tube lamp 500 in FIG. 5A, and may instead be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.), etc.

Figure 6:
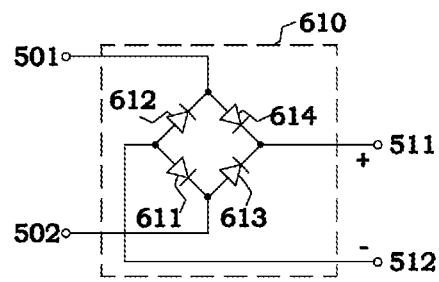
FIG. 6 is a schematic diagram of a rectifying circuit according to some embodiments.

FIG. 6 is a schematic diagram of a rectifying circuit according to an embodiment. Referring to FIG. 6, a rectifying circuit 610, i.e. a bridge rectifier, includes four rectifying diodes 611, 612, 613, and 614, configured to full-wave rectify a received signal. The diode 611 has an anode connected to the output terminal 512, and a cathode connected to the pin 502. The diode 612 has an anode connected to the output terminal 512, and a cathode connected to the pin 501. The diode 613 has an anode connected to the pin 502, and a cathode connected to the output terminal 511. The diode 614 has an anode connected to the pin 501, and a cathode connected to the output terminal 511.

When the pins 501 and 502 receive an AC signal, the rectifying circuit 610 operates as follows. During the connected AC signal's positive half cycle, the AC signal is input through the pin 501, the diode 614, and the output terminal 511 in sequence, and later output through the output terminal 512, the diode 611, and the pin 502 in sequence. During the connected AC signal's negative half cycle, the AC signal is input through the pin 502, the diode 613, and the output terminal 511 in sequence, and later output through the output terminal 512, the diode 612, and the pin 501 in sequence. Therefore, during the connected AC signal's full cycle, the positive pole of the rectified signal produced by the rectifying circuit 610 keeps at the output terminal 511, and the negative pole of the rectified signal remains at the output terminal 512. Accordingly, the rectified signal produced or output by the rectifying circuit 610 is a full-wave rectified signal.

When the pins 501 and 502 are coupled to a DC power supply to receive a DC signal, the rectifying circuit 610 operates as follows. When the pin 501 is coupled to the positive end of the DC power supply and the pin 502 to the negative end of the DC power supply, the DC signal is input through the pin 501, the diode 614, and the output terminal 511 in sequence, and later output through the output terminal 512, the diode 611, and the pin 502 in sequence. When the pin 501 is coupled to the negative end of the DC power supply and the pin 502 to the positive end of the DC power supply, the DC signal is input through the pin 502, the diode 613, and the output terminal 511 in sequence, and later output through the output terminal 512, the diode 612, and the pin 501 in sequence. Therefore, no matter what the electrical polarity of the DC signal is between the pins 501 and 502, the positive pole of the rectified signal produced by the rectifying circuit 610 keeps at the output terminal 511, and the negative pole of the rectified signal remains at the output terminal 512.

Therefore, the rectifying circuit 610 in this embodiment can output or produce a proper rectified signal regardless of whether the received input signal is an AC or DC signal.

Figure 7A:
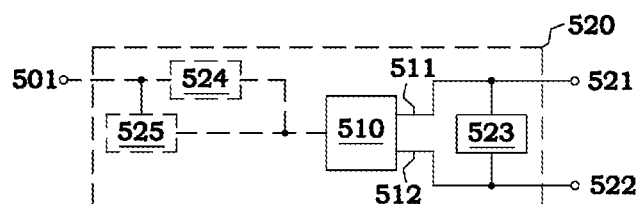
FIGS. 7A-7C are some block diagrams of a filtering circuit according to some embodiments.

FIG. 7A is a block diagram of the filtering circuit according to an embodiment. A rectifying circuit 510 is shown in FIG. 7A for illustrating its connection with other components, without intending a filtering circuit 520 to include the rectifying circuit 510. Referring to FIG. 7A, the filtering circuit 520 includes a filtering unit 523 coupled to two rectifying output terminals 511 and 512 to receive and to filter out ripples of a rectified signal from the rectifying circuit 510. Accordingly, the waveform of a filtered signal is smoother than that of the rectified signal. The filtering circuit 520 may further include another filtering unit 524 coupled between a rectifying circuit and a pin correspondingly, for example, between the rectifying circuit 510 and the pin 501, the rectifying circuit 510 and the pin 502, the rectifying circuit 540 and the pin 503, and/or the rectifying circuit 540 and the pin 504. The filtering unit 524 is used to filter a specific frequency, for example, to filter out a specific frequency of an external driving signal. In this embodiment, the filtering unit 524 is coupled between the rectifying circuit 510 and the pin 501. The filtering circuit 520 may further include another filtering unit 525 coupled between one of the pins 501 and 502 and one of the diodes of the rectifying circuit 510, or between one of the pins 503 and 504 and one of the diodes of the rectifying circuit 540 to reduce or filter out electromagnetic interference (EMI). In this embodiment, the filtering unit 525 is coupled between the pin 501 and one of diodes (not shown in FIG. 7A) of the rectifying circuit 510. Since the filtering units 524 and 525 may be present or omitted depending on actual circumstances of their uses, they are depicted by a dotted line in FIG. 7A.

Figure 7B:
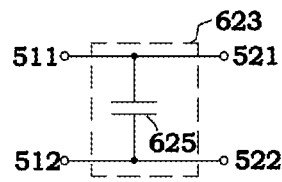

FIG. 7B is a schematic diagram of the filtering unit according to an embodiment. Referring to FIG. 7B, a filtering unit 623 includes a capacitor 625 having an end coupled to the output terminal 511 and a filtering output terminal 521 and the other end thereof coupled to the output terminal 512 and a filtering output terminal 522, and is configured to low-pass filter a rectified signal from the output terminals 511 and 512, so as to filter out high-frequency components of the rectified signal and thereby output a filtered signal at the filtering output terminals 521 and 522.

Figure 7C:
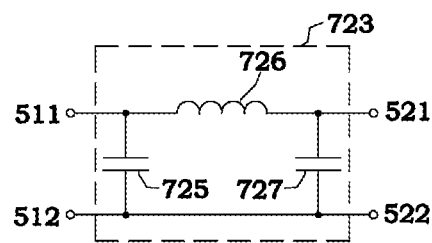

FIG. 7C is a schematic diagram of the filtering unit according to an embodiment. Referring to FIG. 7C, a filtering unit 723 includes a pi filter circuit including a capacitor 725, an inductor 726, and a capacitor 727. As is well known, a pi filter circuit looks like the symbol π in its shape or structure. The capacitor 725 has an end connected to the output terminal 511 and coupled to the filtering output terminal 521 through the inductor 726, and has another end connected to the output terminal 512 and the filtering output terminal 522. The inductor 726 is coupled between output terminal 511 and the filtering output terminal 521. The capacitor 727 has an end connected to the filtering output terminal 521 and coupled to the output terminal 511 through the inductor 726, and has another end connected to the output terminal 512 and the filtering output terminal 522.

As seen between the output terminals 511 and 512 and the filtering output terminals 521 and 522, the filtering unit 723 compared to the filtering unit 623 in FIG. 7B additionally has an inductor 726 and a capacitor 727, which perform the function of low-pass filtering like the capacitor 725 does. Therefore, the filtering unit 723 in this embodiment compared to the filtering unit 623 in FIG. 7B has a better ability to filter out high-frequency components to output a filtered signal with a smoother waveform.

The inductance values of the inductor 726 in the embodiments mentioned above are chosen in the range of, for example in some embodiments, about 10 nH to 10 mH. And the capacitance values of the capacitors 625, 725, and 727 in the embodiments stated above are chosen in the range of, for example in some embodiments, about 100 pF to 1 uF.

Figure 8A:
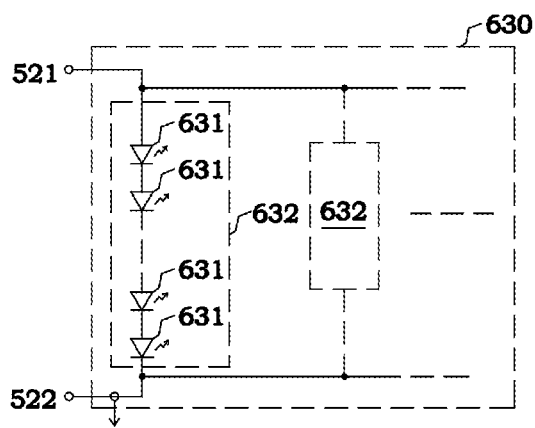
FIGS. 8A and 8B are some schematic diagrams of an LED module according to some embodiments.

FIG. 8A is a schematic diagram of an LED module according to an embodiment. Referring to FIG. 8A, an LED module 630 has an anode connected to a filtering output terminal 521, a cathode connected to a filtering output terminal 522, and includes at least one LED unit 632, such as the light source mentioned above. When two or more LED units are included, they are connected in parallel. The anode of each LED unit 632 is connected to the anode of LED module 630 to couple with the filtering output terminal 521, and the cathode of each LED unit 632 is connected to the cathode of LED module 630 to couple to the filtering output terminal 522. Each LED unit 632 includes at least one LED 631. When multiple LEDs 631 are included in an LED unit 632, they are connected in series with the anode of the first LED 631 connected to the anode of this LED unit 632 and the cathode of the first LED 631 connected to the next or second LED 631. And the anode of the last LED 631 in this LED unit 632 is connected to the cathode of a previous LED 631 and the cathode of the last LED 631 connected to the cathode of this LED unit 632.

In some embodiments, the LED module 630 may produce a current detection signal S531 reflecting the magnitude of current through the LED module 630 and being used for controlling or detecting the LED module 630.

Figure 8B:
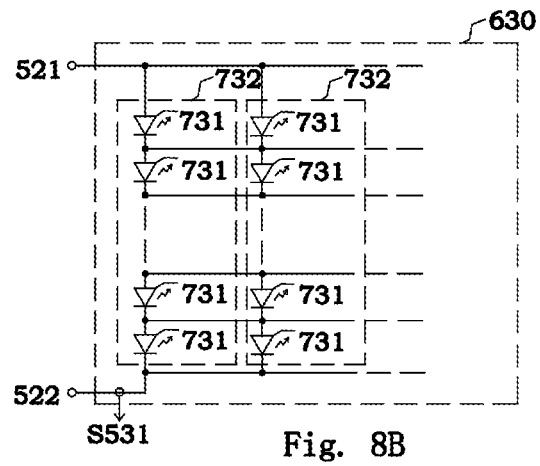

FIG. 8B is a schematic diagram of an LED module according to an exemplary embodiment. Referring to FIG. 8B, an LED module 630 has an anode connected to a filtering output terminal 521, a cathode connected to a filtering output terminal 522, and includes at least two LED units 732 with the anode of each LED unit 732 connected to the anode of LED module 630 and the cathode of each LED unit 732 connected to the cathode of LED module 630. Each LED unit 732 includes at least two LEDs 731 connected in the same way as those described in FIG. 8A. For example, the anode of the first LED 731 in an LED unit 732 is connected to the anode of this LED unit 732, the cathode of the first LED 731 is connected to the anode of the next or second LED 731, and the cathode of the last LED 731 is connected to the cathode of this LED unit 732. Further, LED units 732 in an LED module 630 are connected to each other in this embodiment. All of the n-th LEDs 731 in the related LED units 732 thereof are connected by their anodes and cathodes, such as those shown in FIG. 8B but not limit to, where n is a positive integer. In this way, the LEDs in the LED module 630 of this embodiment are connected in the form of a mesh.

In some embodiments, the LED lighting module 530 in the above embodiments includes the LED module 630, but doesn't include a driving circuit for the LED module 630.

Also, the LED module 630 in this embodiment may produce a current detection signal S531 reflecting the magnitude of current through the LED module 630 and being used for controlling or detecting the LED module 630.

In some embodiments, the number of LEDs 731 included by an LED unit 732 is in the range of 15-25, and may be in some embodiments in the range of 18-22.

Figure 8C:
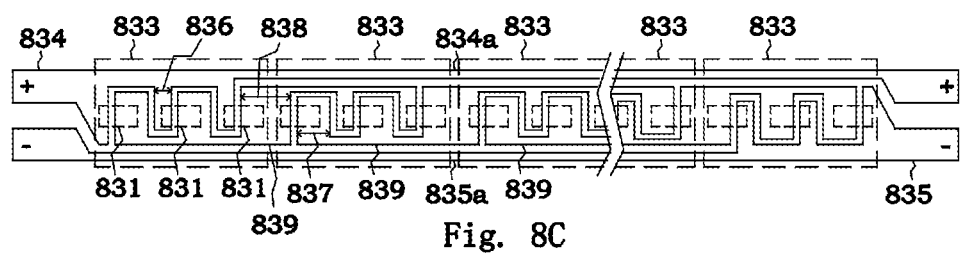
FIGS. 8C-8E are some plan views of a circuit layout of the LED module according to some embodiments.

FIG. 8C is a plan view of a circuit layout of the LED module according to an embodiment. Referring to FIG. 8C, in this embodiment, multiple LEDs 831 are connected in the same way as described in FIG. 8B, and three LED units are assumed in the LED module 630 and described as follows for illustration. A positive conductive line 834 and a negative conductive line 835 are to receive a driving signal for supplying power to the LEDs 831. For example, the positive conductive line 834 may be coupled to the filtering output terminal 521 of the filtering circuit 520 described above, and the negative conductive line 835 coupled to the filtering output terminal 522 of the filtering circuit 520 to receive a filtered signal. For the convenience of illustration, all three of the n-th LEDs 831 in the three related LED units thereof are grouped as an LED set 833 in FIG. 8C.

The positive conductive line 834 connects the three first LEDs 831 of the leftmost three related LED units thereof, that is, connects the anodes on the left sides of the three first LEDs 831 as shown in the leftmost LED set 833 of FIG. 8C. The negative conductive line 835 connects the three last LEDs 831 of the rightmost three corresponding LED units thereof, that is, connects the cathodes on the right sides of the three last LEDs 831 as shown in the rightmost LED set 833 of FIG. 8C. The cathodes of the three first LEDs 831, the anodes of the three last LEDs 831, and the anodes and cathodes of all the remaining LEDs 831 are connected by conductive lines or parts 839.

For example, the anodes of the three LEDs 831 in the leftmost LED set 833 may be connected together by the positive conductive line 834, and their cathodes may be connected together by a leftmost conductive part 839. The anodes of the three LEDs 831 in the second, next-leftmost LED set 833 are also connected together by the leftmost conductive part 839, whereas their cathodes are connected together by a second, next-leftmost conductive part 839. Since the cathodes of the three LEDs 831 in the leftmost LED set 833 and the anodes of the three LEDs 831 in the second, next-leftmost LED set 833 are connected together by the same leftmost conductive part 839, the cathode of the first LED 831 in each of the three LED units is connected to the anode of the next or second LED 831. As for the remaining LEDs 831 are also connected in the same way. Accordingly, all the LEDs 831 of the three LED units are connected to form the mesh as shown in FIG. 8B.

In this embodiment, the length 836 of a portion of each conductive part 839 that connects to the anode of an LED 831 is smaller than the length 837 of another portion of each conductive part 839 that connects to the cathode of an LED 831. This makes the area of the latter portion connecting to the cathode larger than that of the former portion connecting to the anode. Moreover, the length 837 may be smaller than a length 838 of a portion of each conductive part 839 that connects the cathode of an LED 831 and the anode of the next LED 831 in two adjacent LED sets 833. This makes the area of the portion of each conductive part 839 that connects a cathode and an anode larger than the area of any other portion of each conductive part 839 that connects to only a cathode or an anode of an LED 831. Due to the length differences and area differences, this layout structure improves heat dissipation of the LEDs 831.

In some embodiments, the positive conductive line 834 includes a lengthwise portion 834a, and the negative conductive line 835 includes a lengthwise portion 835a, which are conducive to make the LED module have a positive "+" connective portion and a negative "−" connective portion at each of the two ends of the LED module, as shown in FIG. 8C. Such a layout structure allows for coupling any of other circuits of the power supply module of the LED lamp, including e.g. the filtering circuit 520 and the rectifying circuits 510 and 540, to the LED module through the positive connective portion and/or the negative connective portion at each or both ends of the LED lamp. Thus the layout structure increases the flexibility in arranging actual circuits in the LED lamp.

Figure 8D:
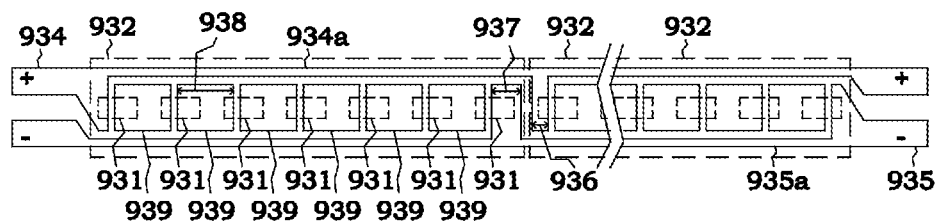

FIG. 8D is a plan view of a circuit layout of the LED module according to another embodiment. Referring to FIG. 8D, in this embodiment, multiple LEDs 931 are connected in the same way as described in FIG. 8A, and three LED units each including 7 LEDs 931 are assumed in the LED module 630 and described as follows for illustration. A positive conductive line 934 and a negative conductive line 935 are to receive a driving signal for supplying power to the LEDs 931. For example, the positive conductive line 934 may be coupled to the filtering output terminal 521 of the filtering circuit 520 described above, and the negative conductive line 935 is coupled to the filtering output terminal 522 of the filtering circuit 520, so as to receive a filtered signal. For the convenience of illustration, all seven LEDs 931 of each of the three LED units are grouped as an LED set 932 in FIG. 8D. Thus there are three LED sets 932 corresponding to the three LED units.

The positive conductive line 934 connects the anode on the left side of the first or leftmost LED 931 of each of the three LED sets 932. The negative conductive line 935 connects the cathode on the right side of the last or rightmost LED 931 of each of the three LED sets 932. In each LED set 932 of each two adjacent LEDs 931, the LED 931 on the left has a cathode connected by a conductive part 939 to an anode of the LED 931 on the right. By such a layout, the LEDs 931 of each LED set 932 are connected in series.

In some embodiments, the conductive part 939 may be used to connect an anode and a cathode of two consecutive LEDs 931 respectively. The negative conductive line 935 connects the cathode of the last or rightmost LED 931 of each of the three LED sets 932. And the positive conductive line 934 connects the anode of the first or leftmost LED 931 of each of the three LED sets 932. Therefore, as shown in FIG. 8D, the length of the conductive part 939 is larger than that of the portion of negative conductive line 935 connecting to a cathode, which length is then larger than that of the portion of positive conductive line 934 connecting to an anode. For example, the length 938 of the conductive part 939 may be larger than the length 937 of the portion of negative conductive line 935 connecting a cathode of an LED 931, which length 937 is then larger than the length 936 of the portion of the positive conductive line 934 connecting an anode of an LED 931. Such a layout structure improves heat dissipation of the LEDs 931 in LED module 630.

The positive conductive line 934 may include a lengthwise portion 934a, and the negative conductive line 935 may include a lengthwise portion 935a, which are conducive to make the LED module have a positive "+" connective portion and a negative "−" connective portion at each of the two ends of the LED module, as shown in FIG. 8D. Such a layout structure allows for coupling any of other circuits of the power supply module of the LED lamp, including e.g. the filtering circuit 520 and the rectifying circuits 510 and 540, to the LED module through the positive connective portion 934a and/or the negative connective portion 935a at each or both ends of the LED lamp. Thus the layout structure increases the flexibility in arranging actual circuits in the LED lamp.

Further, the circuit layouts as shown in FIGS. 8C and 8D may be implemented with a bendable circuit sheet or substrate, which may even be called flexible circuit board depending on its specific definition used. For example, the bendable circuit sheet may comprise one conductive layer where the positive conductive line 834, the positive lengthwise portion 834a, the negative conductive line 835, the negative lengthwise portion 835a, and the conductive parts 839 shown in FIG. 8C, and the positive conductive line 934, the positive lengthwise portion 934a, the negative conductive line 935, the negative lengthwise portion 935a, and the conductive parts 939 shown in FIG. 8D are formed by the method of etching.

Figure 8E:
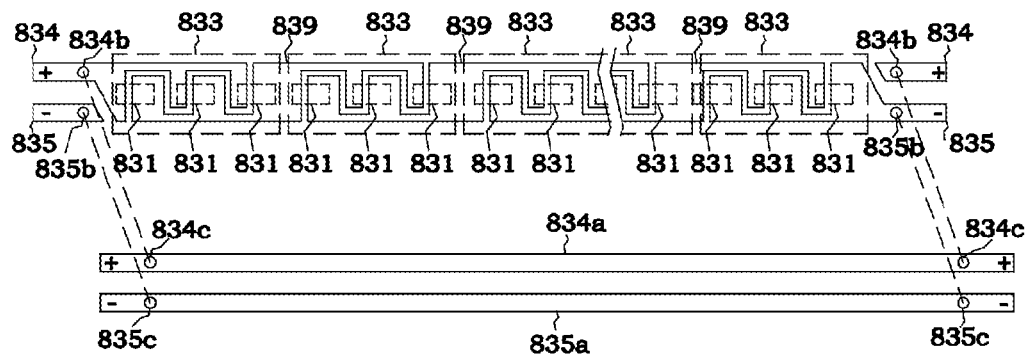

FIG. 8E is a plan view of a circuit layout of the LED module according to another embodiment. The layout structures of the LED module in FIGS. 8E and 8C correspond to the same way of connecting the LEDs 831 as those shown in FIG. 8B, but the layout structure in FIG. 8E comprises two conductive layers instead of only one conductive layer for forming the circuit layout as shown in FIG. 8C. Referring to FIG. 8E, the main difference from the layout in FIG. 8C is that the positive conductive line 834 and the negative conductive line 835 have a lengthwise portion 834a and a lengthwise portion 835a, respectively, that are formed in a second conductive layer instead. The difference is elaborated as follows.

In certain embodiments, a bendable circuit sheet of the LED module includes a first conductive layer and a second conductive layer electrically insulated from each other by a dielectric layer. Of the two conductive layers, the positive conductive line 834, the negative conductive line 835, and the conductive parts 839 in FIG. 8E are formed in first conductive layer by the method of etching for electrically connecting the plurality of LED components 831 e.g. in a form of a mesh, whereas the positive lengthwise portion 834a and the negative lengthwise portion 835a are formed in second conductive layer by etching for electrically connecting (the filtering output terminal of) the filtering circuit. Further, the positive conductive line 834 and the negative conductive line 835 in the first conductive layer have via points 834b and via points 835b, respectively, for connecting to second conductive layer. And the positive lengthwise portion 834a and the negative lengthwise portion 835a in second conductive layer have via points 834c and via points 835c, respectively. The via points 834b are positioned corresponding to the via points 834c, for connecting the positive conductive line 834 and the positive lengthwise portion 834a. The via points 835b are positioned corresponding to the via points 835c, for connecting the negative conductive line 835 and the negative lengthwise portion 835a. An exemplary desirable way of connecting the two conductive layers is to form a hole connecting each via point 834b and a corresponding via point 834c, and to form a hole connecting each via point 835b and a corresponding via point 835c, with the holes extending through the two conductive layers and the dielectric layer in-between. And the positive conductive line 834 and the positive lengthwise portion 834a can be electrically connected by welding metallic part(s) through the connecting hole(s), and the negative conductive line 835 and the negative lengthwise portion 835a can be electrically connected by welding metallic part(s) through the connecting hole(s). Similarly, the layout structure of the LED module in FIG. 8D may alternatively have the positive lengthwise portion 934a and the negative lengthwise portion 935a disposed in a second conductive layer to constitute a two-layered layout structure.

The positive conductive lines (834 or 934) may be characterized as including two end terminals at opposite ends, a plurality of pads between the two end terminals and for contacting and/or supplying power to LEDs (e.g., anodes of LEDs), and a wire portion, which may be an elongated conductive line extending along a length of an LED light strip and electrically connecting the two end terminals to the plurality of pads. Similarly, the negative conductive lines (835 or 935) may be characterized as including two end terminals at opposite ends, a plurality of pads between the two end terminals and for contacting and/or supplying power to LEDs (e.g., cathodes of LEDs), and a wire portion, which may be an elongated conductive line extending along a length of an LED light strip and electrically connecting the two end terminals to the plurality of pads.

The circuit layouts may be implemented for one of the exemplary LED light strips described previously, for example, to serve as a circuit board or sheet for the LED light strip on which the LED light sources are disposed.

As described herein, an LED unit may refer to a single string of LEDs arranged in series, and an LED module may refer to a single LED unit, or a plurality of LED units connected to a same two nodes (e.g., arranged in parallel). For example, the LED light strip 2 described above may be an LED module and/or LED unit.

In some embodiments, the thickness of the second conductive layer of a two-layered bendable circuit sheet is, in some embodiments, larger than that of the first conductive layer in order to reduce the voltage drop or loss along each of the positive lengthwise portion and the negative lengthwise portion disposed in the second conductive layer. Compared to a one-layered bendable circuit sheet, since a positive lengthwise portion and a negative lengthwise portion are disposed in a second conductive layer in a two-layer bendable circuit sheet, the width (between two lengthwise sides) of the two-layered bendable circuit sheet is or can be reduced. On the same fixture or plate in a production process, the number of bendable circuit sheets each with a shorter width that can be laid together at most is larger than the number of bendable circuit sheets each with a longer width that can be laid together at most. Thus adopting a bendable circuit sheet with a shorter width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, a type of an exemplary LED tube lamp is provided that may have at least some of the electronic components of its power supply module disposed on a light strip of the LED tube lamp. For example, the technique of printed electronic circuit (PEC) can be used to print, insert, or embed at least some of the electronic components onto the LED light strip (e.g., as opposed to being on a separate circuit board connected to the LED light strip).

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components. The production process may be different, however, and still result in some or all electronic components of the power supply module being disposed directly on the LED light strip.

In certain embodiments, if all electronic components of the power supply module are disposed on the LED light strip, electrical connection between the terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, (components of) the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of all electronic components of the power supply module, such as some resistors and/or smaller size capacitors, are printed onto the light strip, and some bigger size components, such as some inductors and/or electrolytic capacitors, are disposed in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the LED light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silkscreen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved, in view of the fact that these welding points are most liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

Figure 9A:
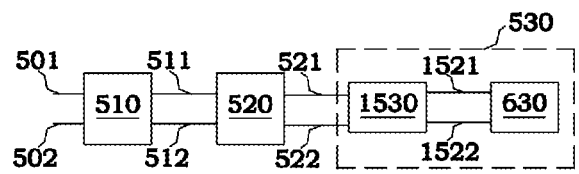
FIG. 9A is a block diagram of an exemplary power supply module in an LED lamp according to some embodiments.

FIG. 9A is a block diagram of a power supply module in an LED lamp according to an embodiment. As shown in FIG. 9A, the power supply module of the LED lamp includes a rectifying circuit 510, a filtering circuit 520, and may further include some parts of an LED lighting module 530. The LED lighting module 530 in this embodiment comprises a driving circuit 1530 and an LED module 630. The driving circuit 1530 comprises a DC-to-DC converter circuit, and is coupled to the filtering output terminals 521 and 522 to receive a filtered signal and then perform power conversion for converting the filtered signal into a driving signal at the driving output terminals 1521 and 1522. The LED module 630 is coupled to the driving output terminals 1521 and 1522 to receive the driving signal for emitting light. In some embodiments, the current of LED module 630 is stabilized at an objective current value. Descriptions of this LED module 630 are the same as those provided above with reference to FIGS. 8A-8E.

In some embodiments, the LED lighting module 530 shown in FIG. 5B may include the driving circuit 1530 and the LED module 630 as shown in FIG. 9A. Thus, the power supply module for the LED lamp in the present embodiment can be applied to the single-end power supply structure, such as LED light bulbs, personal area lights (PAL), and so forth.

Figure 9B:
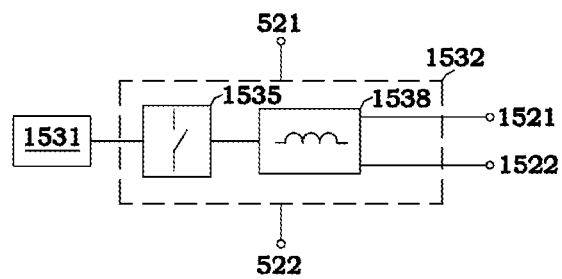
FIG. 9B is a block diagram of a driving circuit according to some embodiments.

FIG. 9B is a block diagram of the driving circuit according to an embodiment. Referring to FIG. 9B, a driving circuit includes a controller 1531, and a conversion circuit 1532 for power conversion based on a current source, for driving the LED module to emit light. The conversion circuit 1532 includes a switching circuit 1535 and an energy storage circuit 1538. And the conversion circuit 1532 is coupled to the filtering output terminals 521 and 522 to receive and then convert a filtered signal, under the control by the controller 1531, into a driving signal at the driving output terminals 1521 and 1522 for driving the LED module. Under the control by the controller 1531, the driving signal output by the conversion circuit 1532 comprises a steady current, making the LED module emitting steady light.

Figure 9C:
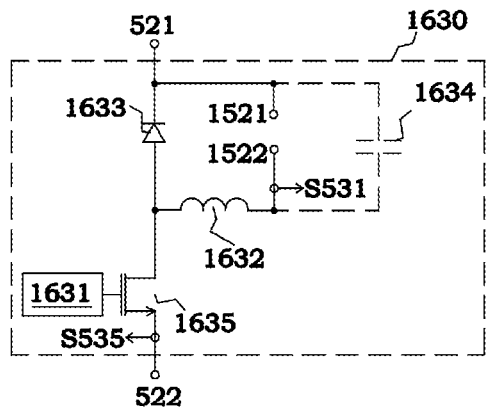
FIGS. 9C-9F are some schematic diagrams of a driving circuit according to some embodiments.

FIG. 9C is a schematic diagram of the driving circuit according to an embodiment. Referring to FIG. 9C, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. The driving circuit 1630 is coupled to the filtering output terminals 521 and 522 to receive and then convert a filtered signal into a driving signal for driving an LED module connected between the driving output terminals 1521 and 1522.

In this embodiment, the switch 1635 includes a metal-oxide-semiconductor field-effect transistor (MOSFET) and has a first terminal coupled to the anode of freewheeling diode 1633, a second terminal coupled to the filtering output terminal 522, and a control terminal coupled to the controller 1631 used for controlling current conduction or cutoff between the first and second terminals of switch 1635. The driving output terminal 1521 is connected to the filtering output terminal 521, and the driving output terminal 1522 is connected to an end of the inductor 1632, which has another end connected to the first terminal of switch 1635. The capacitor 1634 is coupled between the driving output terminals 1521 and 1522 to stabilize the voltage between the driving output terminals 1521 and 1522. The freewheeling diode 1633 has a cathode connected to the driving output terminal 1521.

Next, a description follows as to an exemplary operation of the driving circuit 1630.

The controller 1631 is configured for determining when to turn the switch 1635 on (in a conducting state) or off (in a cutoff state) according to a current detection signal S535 and/or a current detection signal S531. For example, in some embodiments, the controller 1631 is configured to control the duty cycle of switch 1635 being on and switch 1635 being off in order to adjust the size or magnitude of the driving signal. The current detection signal S535 represents the magnitude of current through the switch 1635. The current detection signal S531 represents the magnitude of current through the LED module coupled between the driving output terminals 1521 and 1522. The controller 1631 may control the duty cycle of the switch 1635 being on and off, based on, for example, a magnitude of a current detected based on current detection signal S531 or S535. As such, when the magnitude is above a threshold, the switch may be off (cutoff state) for more time, and when magnitude goes below the threshold, the switch may be on (conducting state) for more time. According to any of current detection signal S535 and current detection signal S531, the controller 1631 can obtain information on the magnitude of power converted by the converter circuit. When the switch 1635 is switched on, a current of a filtered signal is input through the filtering output terminal 521, and then flows through the capacitor 1634, the driving output terminal 1521, the LED module, the inductor 1632, and the switch 1635, and then flows out from the filtering output terminal 522. During this flowing of current, the capacitor 1634 and the inductor 1632 are performing storing of energy. On the other hand, when the switch 1635 is switched off, the capacitor 1634 and the inductor 1632 perform releasing of stored energy by a current flowing from the freewheeling diode 1633 to the driving output terminal 1521 to make the LED module continuing to emit light.

In some embodiments, the capacitor 1634 is an optional element, so it can be omitted and is thus depicted in a dotted line in FIG. 9C. In some application environments, the natural characteristic of an inductor to oppose instantaneous change in electric current passing through the inductor may be used to achieve the effect of stabilizing the current through the LED module, thus omitting the capacitor 1634.

From another aspect, the driving circuit 1630 makes the current of LED module remain stable, thus the color temperature may not change with current to some LED module, such as white, red, blue, green LED modules. For example, LED can retain the same color temperature under different illumination. In some embodiments, the inductor 1632 playing the role of the energy-storing circuit releases the stored power when the switch 1635 cuts off, and this is for making the LED module keeping lighting and also keeping the voltage/current on the LED module being not likely to go the minimum value. In this way, when the switch 1635 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 9D:
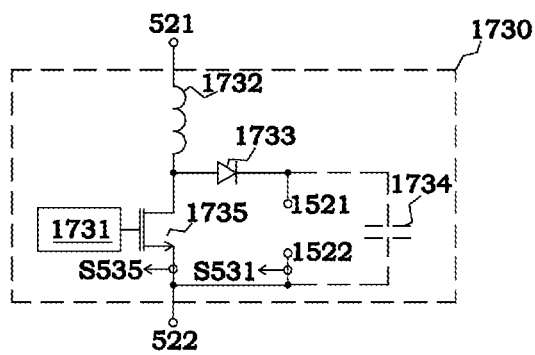

FIG. 9D is a schematic diagram of the driving circuit according to an embodiment. Referring to FIG. 9D, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. The driving circuit 1730 is configured to receive and then convert a filtered signal from the filtering output terminals 521 and 522 into a driving signal for driving an LED module coupled between the driving output terminals 1521 and 1522.

The inductor 1732 has an end connected to the filtering output terminal 521, and another end connected to the anode of freewheeling diode 1733 and a first terminal of the switch 1735, which has a second terminal connected to the filtering output terminal 522 and the driving output terminal 1522. The freewheeling diode 1733 has a cathode connected to the driving output terminal 1521. And the capacitor 1734 is coupled between the driving output terminals 1521 and 1522.

The controller 1731 is coupled to a control terminal of switch 1735, and is configured for determining when to turn the switch 1735 on (in a conducting state) or off (in a cutoff state), according to a current detection signal S535 and/or a current detection signal S531. When the switch 1735 is switched on, a current of a filtered signal is input through the filtering output terminal 521, and then flows through the inductor 1732 and the switch 1735, and then flows out from the filtering output terminal 522. During this flowing of current, the current through the inductor 1732 increases with time, with the inductor 1732 being in a state of storing energy, while the capacitor 1734 enters a state of releasing energy, making the LED module continuing to emit light. On the other hand, when the switch 1735 is switched off, the inductor 1732 enters a state of releasing energy as the current through the inductor 1732 decreases with time. In this state, the current through the inductor 1732 then flows through the freewheeling diode 1733, the capacitor 1734, and the LED module, while the capacitor 1734 enters a state of storing energy.

In some embodiments the capacitor 1734 is an optional element, so it can be omitted and is thus depicted in a dotted line in FIG. 9D. When the capacitor 1734 is omitted and the switch 1735 is switched on, the current of inductor 1732 does not flow through the LED module, making the LED module not emit light; but when the switch 1735 is switched off, the current of inductor 1732 flows through the freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, the driving circuit 1730 makes the current of LED module remain stable, thus the color temperature may not change with current to some LED module, such as white, red, blue, green LED modules. For example, LED can retain the same color temperature under different illumination. In some embodiments, the inductor 1732 playing the role of the energy-storing circuit releases the stored power when the switch 1735 cuts off, and this is for making the LED module keeping lighting and also keeping the voltage/current on the LED module being not likely to go the minimum value. In this way, when the switch 1735 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 9E:
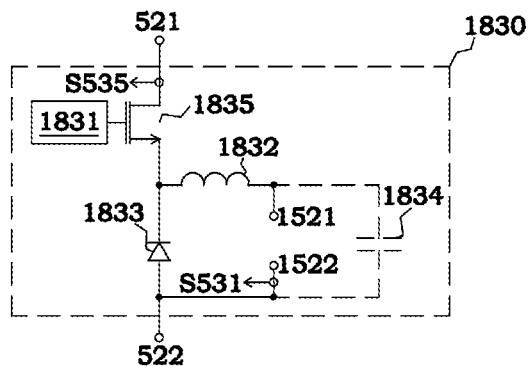

FIG. 9E is a schematic diagram of the driving circuit according to an exemplary embodiment. Referring to FIG. 9E, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. The driving circuit 1830 is coupled to the filtering output terminals 521 and 522 to receive and then convert a filtered signal into a driving signal for driving an LED module connected between the driving output terminals 1521 and 1522.

The switch 1835 has a first terminal coupled to the filtering output terminal 521, a second terminal coupled to the cathode of freewheeling diode 1833, and a control terminal coupled to the controller 1831 to receive a control signal from the controller 1831 for controlling current conduction or cutoff between the first and second terminals of the switch 1835. The anode of freewheeling diode 1833 is connected to the filtering output terminal 522 and the driving output terminal 1522. The inductor 1832 has an end connected to the second terminal of switch 1835, and another end connected to the driving output terminal 1521. The capacitor 1834 is coupled between the driving output terminals 1521 and 1522 to stabilize the voltage between the driving output terminals 1521 and 1522.

The controller 1831 is configured for controlling when to turn the switch 1835 on (in a conducting state) or off (in a cutoff state) according to a current detection signal S535 and/or a current detection signal S531. When the switch 1835 is switched on, a current of a filtered signal is input through the filtering output terminal 521, and then flows through the switch 1835, the inductor 1832, and the driving output terminals 1521 and 1522, and then flows out from the filtering output terminal 522. During this flowing of current, the current through the inductor 1832 and the voltage of the capacitor 1834 both increase with time, so the inductor 1832 and the capacitor 1834 are in a state of storing energy. On the other hand, when the switch 1835 is switched off, the inductor 1832 is in a state of releasing energy and thus the current through it decreases with time. In this case, the current through the inductor 1832 circulates through the driving output terminals 1521 and 1522, the freewheeling diode 1833, and back to the inductor 1832.

In some embodiments the capacitor 1834 is an optional element, so it can be omitted and is thus depicted in a dotted line in FIG. 9E. When the capacitor 1834 is omitted, no matter whether the switch 1835 is turned on or off, the current through the inductor 1832 will flow through the driving output terminals 1521 and 1522 to drive the LED module to continue emitting light.

From another aspect, the driving circuit 1830 makes the current of LED module remain stable, thus the color temperature may not change with current to some LED module, such as white, red, blue, green LED modules. For example, LED can retain the same color temperature under different illumination. In some embodiments, the inductor 1832 playing the role of the energy-storing circuit releases the stored power when the switch 1835 cuts off, and this is for making the LED module keeping lighting and also keeping the voltage/current on the LED module being not likely to go the minimum value. In this way, when the switch 1835 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 9F:
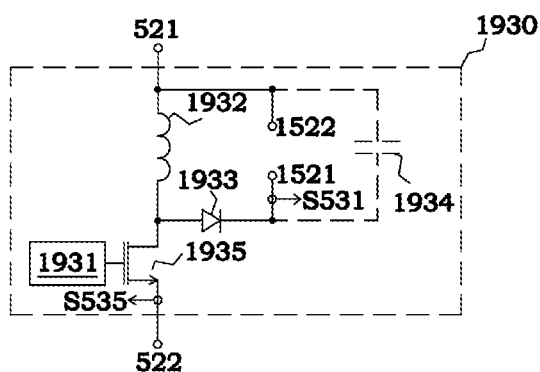

FIG. 9F is a schematic diagram of the driving circuit according to an exemplary embodiment. Referring to FIG. 9F, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. The driving circuit 1930 is coupled to the filtering output terminals 521 and 522 to receive and then convert a filtered signal into a driving signal for driving an LED module connected between the driving output terminals 1521 and 1522.

The inductor 1932 has an end connected to the filtering output terminal 521 and the driving output terminal 1522, and another end connected to a first end of the switch 1935. The switch 1935 has a second end connected to the filtering output terminal 522, and a control terminal connected to controller 1931 to receive a control signal from controller 1931 for controlling current conduction or cutoff of the switch 1935. The freewheeling diode 1933 has an anode coupled to a node connecting the inductor 1932 and the switch 1935, and a cathode coupled to the driving output terminal 1521. The capacitor 1934 is coupled to the driving output terminals 1521 and 1522 to stabilize the driving of the LED module coupled between the driving output terminals 1521 and 1522.

The controller 1931 is configured for controlling when to turn the switch 1935 on (in a conducting state) or off (in a cutoff state) according to a current detection signal S531 and/or a current detection signal S535. When the switch 1935 is turned on, a current is input through the filtering output terminal 521, and then flows through the inductor 1932 and the switch 1935, and then flows out from the filtering output terminal 522. During this flowing of current, the current through the inductor 1932 increases with time, so the inductor 1932 is in a state of storing energy; but the voltage of the capacitor 1934 decreases with time, so the capacitor 1934 is in a state of releasing energy to keep the LED module continuing to emit light. On the other hand, when the switch 1935 is turned off, the inductor 1932 is in a state of releasing energy and its current decreases with time. In this case, the current through the inductor 1932 circulates through the freewheeling diode 1933, the driving output terminals 1521 and 1522, and back to the inductor 1932. During this circulation, the capacitor 1934 is in a state of storing energy and its voltage increases with time.

In some embodiments the capacitor 1934 is an optional element, so it can be omitted and is thus depicted in a dotted line in FIG. 9F. When the capacitor 1934 is omitted and the switch 1935 is turned on, the current through the inductor 1932 doesn't flow through the driving output terminals 1521 and 1522, thereby making the LED module not emit light. On the other hand, when the switch 1935 is turned off, the current through the inductor 1932 flows through the freewheeling diode 1933 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

In some embodiments, the driving circuit 1930 makes the current of LED module remain stable, thus the color temperature may not change with current to some LED module, such as white, red, blue, green LED modules. For example, LED can retain the same color temperature under different illumination. In some embodiments, the inductor 1932 playing the role of the energy-storing circuit releases the stored power when the switch 1935 cuts off, and this is for making the LED module keeping lighting and also keeping the voltage/current on the LED module being not likely to go the minimum value. In this way, when the switch 1935 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

In certain exemplary embodiments, the conversion efficiency of the driving circuits is above 80%. In some embodiments, the conversion efficiency of the driving circuits is above 90%. In still other embodiments, the conversion efficiency of the driving circuits is above 92%. The illumination efficiency of the LED lamps is above 120 lm/W. In some embodiments, the illumination efficiency of the LED lamps is above 160 lm/W. The illumination efficiency including the combination of the driving circuits and the LED modules is above 120 lm/W*90%=108 lm/W. In some embodiments, the illumination efficiency including the combination of the driving circuits and the LED modules is above 160 lm/W*92° A=147.21 lm/W.

In some embodiments, the transmittance of the diffusion film in the LED tube lamp is above 85%. As a result, in certain embodiments, the illumination efficiency of the LED lamps is above 108 lm/W*85%=91.8 lm/W. In some embodiments, the illumination efficiency of the LED lamps is above 147.21 lm/W*85%=125.12 lm/W.

Figure 10A:
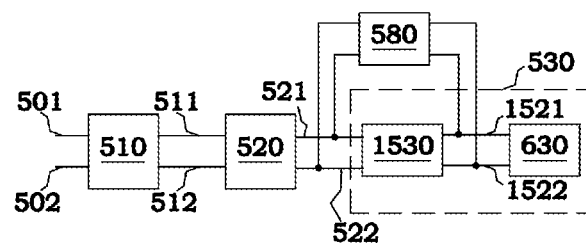
FIG. 10A is a block diagram of an exemplary power supply module in an LED lamp according to some embodiments.

FIG. 10A is a block diagram of a power supply module in an LED lamp according to an exemplary embodiment. Compared to FIG. 9A, the embodiment of FIG. 10A includes a rectifying circuits 510, a filtering circuit 520, and a driving circuit 1530, and further includes a mode switching circuit 580. In this embodiment, a driving circuit 1530 and an LED module 630 compose the LED lighting module 530. According to this exemplary embodiment, the mode switching circuit 580 may be added between the LED module 630 and the driving circuit 1530 for switching the filtered signal from the filtering circuit 520 directly or through the driving circuit 1530 inputting into the LED module 630. For example, the mode switching circuit 580 is coupled to at least one of the filtering output terminals 521 and 522 of the filtering circuit 520 and at least one of the driving output terminals 1521 and 1522 of the driving circuit 1530, for determining whether to perform a first driving mode or a second driving mode according to a frequency (or voltage) of the external driving signal received by the LED lamp through the pins 501, 502, 503, and 504. As such, the mode switching circuit 580 may be set to the first driving mode or the second driving mode, in order to select between the LED module 630 operating under either the first driving mode or the second driving mode. In the first driving mode, a filtered signal from the filtering circuit 520 is input into the driving circuit 1530 (e.g., a driving signal is received at the LED module 630 from driving circuit 1530), while in the second driving mode the filtered signal bypasses at least a component of the driving circuit 1530, making the driving circuit 1530 stop working in conducting the filtered signal, allowing the filtered signal to (directly) reach and drive the LED module 630, without passing through the driving circuit 1530 (e.g., a driving signal is received at the LED module 630 from mode switching circuit 580, which may also be referred to as bypass circuit 580). The bypassed component(s) of the driving circuit 1530 may include an inductor or a switch, which when bypassed makes the driving circuit 1530 unable to transfer and/or convert power, and then prevents the driving circuit 1530 from conducting the filtered signal. If the driving circuit 1530 includes a capacitor, the capacitor can still be used to filter out ripples of the filtered signal in order to stabilize the voltage across the LED module. When the mode switching circuit 580 determines to perform the first driving mode, allowing the filtered signal to be input to the driving circuit 1530, the driving circuit 1530 then transforms the filtered signal into a driving signal for driving the LED module 630 to emit light. On the other hand, when the mode switching circuit 580 determines to perform the second driving mode, allowing the filtered signal to bypass the driving circuit 1530 to reach the LED module 630, the filtering circuit 520 becomes in effect a driving circuit for LED module 630. Then the filtering circuit 520 provides the filtered signal as a driving signal for the LED module for driving the LED module to emit light.

Figure 13A:
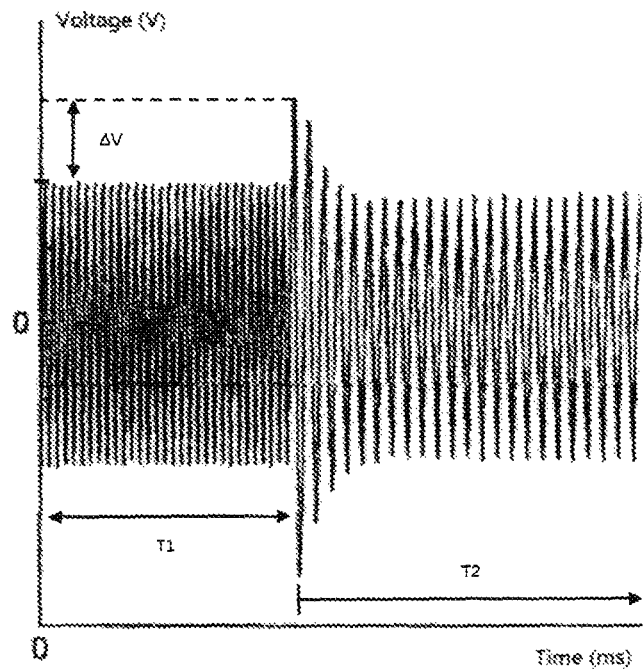
FIGS. 13A and 13B are waveforms of external driving signals according to some embodiments.
Figure 13B:
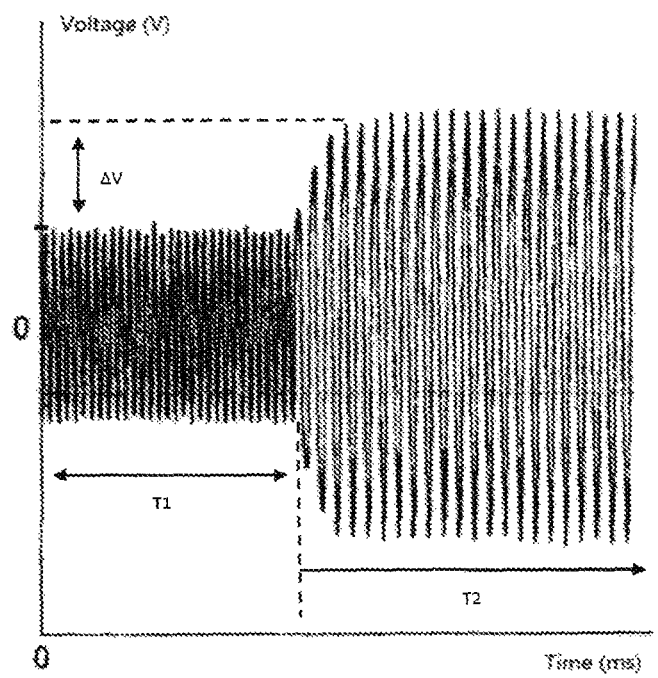

In some embodiments the mode switching circuit 580 can determine whether to perform the first driving mode or the second driving mode based on a user's instruction or a detected signal received by the LED lamp through the pins 501, 502, 503, and 504. With the mode switching circuit, the power supply module of the LED lamp can adapt to or perform one of appropriate driving modes corresponding to different application environments or driving systems, thus improving the compatibility of the LED lamp. The frequency (or voltage) of the external driving signal mentioned above may be changed under abrupt transient conditions, such as supply voltage fluctuation, or under an initially temporary stage. For example, the frequency of the external driving signal from an electronic ballast may be stepped from 40 kHz to 20 kHz for reacting to supply voltage fluctuation or for different stages. Accordingly, the frequency of the external driving signal may include a fixed frequency in a stable state and/or a changed frequency in a variable state. For example, referring to FIGS. 13A and 13B, the frequencies of external driving signals from an electronic ballast may have a step change from 40 kHz, such as during a period T1, to 20 kHz, such as during a period T2, and the voltages of external driving signals are also changed from an original level (a first voltage level) to another level (a second voltage level) with a difference AV.

Figure 10B:
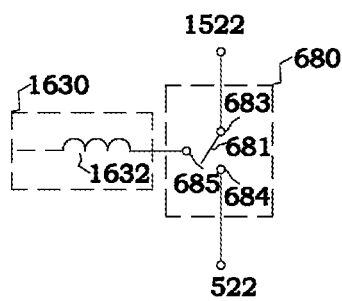
FIGS. 10B-10I are some schematic diagrams of a mode switching circuit in an LED lamp according to some embodiments.

FIG. 10B is a schematic diagram of the mode switching circuit in an LED lamp according to an exemplary embodiment. Referring to FIG. 10B, a mode switching circuit 680 includes a mode switch 681 suitable for use with the driving circuit 1630 in FIG. 9C. Referring to FIGS. 10B and 9C, the mode switch 681 has three terminals 683, 684, and 685, wherein the terminal 683 is coupled to the driving output terminal 1522, the terminal 684 is coupled to the filtering output terminal 522, and the terminal 685 is coupled to the inductor 1632 in the driving circuit 1630.

When the mode switching circuit 680 determines to perform a first driving mode, the mode switch 681 conducts current in a first conductive path through the terminals 683 and 685 and a second conductive path through the terminals 683 and 684 is in a cutoff state. In this case, the driving output terminal 1522 is coupled to the inductor 1632, and therefore the driving circuit 1630 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 680 determines to perform a second driving mode, the mode switch 681 conducts current in the second conductive path through the terminals 683 and 684 and the first conductive path through the terminals 683 and 685 is in a cutoff state. In this case, the driving output terminal 1522 is coupled to the filtering output terminal 522, and therefore the driving circuit 1630 stops working, and a filtered signal is input through the filtering output terminals 521 and 522 to the driving output terminals 1521 and 1522 for driving the LED module, while bypassing the inductor 1632 and the switch 1635 in the driving circuit 1630.

Figure 10C:
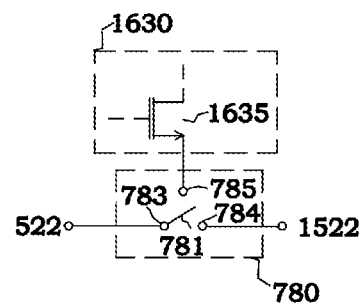

FIG. 10C is a schematic diagram of the mode switching circuit in an LED lamp according to an exemplary embodiment. Referring to FIG. 10C, a mode switching circuit 780 includes a mode switch 781 being suitable for use with the driving circuit 1630 in FIG. 9C. Referring to FIGS. 10C and 9C, the mode switch 781 has three terminals 783, 784, and 785, wherein the terminal 783 is coupled to the filtering output terminal 522, the terminal 784 is coupled to the driving output terminal 1522, and the terminal 785 is coupled to switch 1635 in the driving circuit 1630.

When the mode switching circuit 780 determines on performing a first driving mode, the mode switch 781 conducts current in a first conductive path through the terminals 783 and 785 and a second conductive path through the terminals 783 and 784 is in a cutoff state. In this case, the filtering output terminal 522 is coupled to the switch 1635, and therefore the driving circuit 1630 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 780 determines to perform a second driving mode, the mode switch 781 conducts current in the second conductive path through the terminals 783 and 784 and the first conductive path through the terminals 783 and 785 is in a cutoff state. In this case, the driving output terminal 1522 is coupled to the filtering output terminal 522, and therefore the driving circuit 1630 stops working, and a filtered signal is input through the filtering output terminals 521 and 522 to the driving output terminals 1521 and 1522 for driving the LED module, while bypassing the inductor 1632 and the switch 1635 in the driving circuit 1630.

Figure 10D:
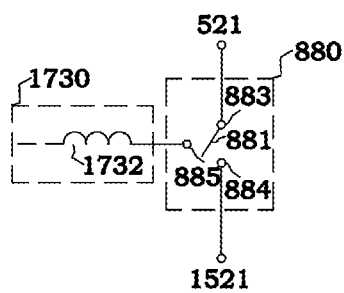

FIG. 10D is a schematic diagram of the mode switching circuit in an LED lamp according to an exemplary embodiment. Referring to FIG. 10D, a mode switching circuit 880 includes a mode switch 881 being suitable for use with the driving circuit 1730 in FIG. 9D. Referring to FIGS. 10D and 9D, the mode switch 881 has three terminals 883, 884, and 885, wherein the terminal 883 is coupled to the filtering output terminal 521, the terminal 884 is coupled to the driving output terminal 1521, and the terminal 885 is coupled to the inductor 1732 in the driving circuit 1730.

When the mode switching circuit 880 determines to perform a first driving mode, the mode switch 881 conducts current in a first conductive path through the terminals 883 and 885 and a second conductive path through the terminals 883 and 884 is in a cutoff state. In this case, the filtering output terminal 521 is coupled to the inductor 1732, and therefore the driving circuit 1730 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 880 determines to perform a second driving mode, the mode switch 881 conducts current in the second conductive path through the terminals 883 and 884 and the first conductive path through the terminals 883 and 885 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 10E:
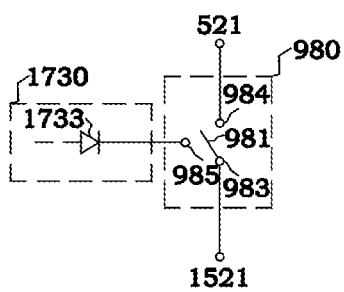

FIG. 10E is a schematic diagram of the mode switching circuit in an LED lamp according to an exemplary embodiment. Referring to FIG. 10E, a mode switching circuit 980 includes a mode switch 981 being suitable for use with the driving circuit 1730 in FIG. 9D. Referring to FIGS. 10E and 9D, the mode switch 981 has three terminals 983, 984, and 985, wherein the terminal 983 is coupled to the driving output terminal 1521, the terminal 984 is coupled to the filtering output terminal 521, and the terminal 985 is coupled to the cathode of diode 1733 in the driving circuit 1730.

When the mode switching circuit 980 determines to perform a first driving mode, the mode switch 981 conducts current in a first conductive path through the terminals 983 and 985, and a second conductive path through the terminals 983 and 984 is in a cutoff state. In this case, the filtering output terminal 521 is coupled to the cathode of diode 1733, and therefore the driving circuit 1730 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 980 determines to perform a second driving mode, the mode switch 981 conducts current in the second conductive path through the terminals 983 and 984 and the first conductive path through the terminals 983 and 985 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 10F:
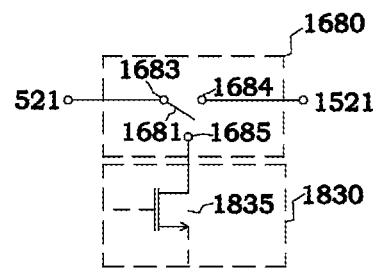

FIG. 10F is a schematic diagram of the mode switching circuit in an LED lamp according to an exemplary embodiment. Referring to FIG. 10F, a mode switching circuit 1680 includes a mode switch 1681 being suitable for use with the driving circuit 1830 in FIG. 9E. Referring to FIGS. 10F and 9E, the mode switch 1681 has three terminals 1683, 1684, and 1685, wherein the terminal 1683 is coupled to the filtering output terminal 521, the terminal 1684 is coupled to the driving output terminal 1521, and the terminal 1685 is coupled to switch 1835 in the driving circuit 1830.

When the mode switching circuit 1680 determines to perform a first driving mode, the mode switch 1681 conducts current in a first conductive path through the terminals 1683 and 1685, and a second conductive path through the terminals 1683 and 1684 is in a cutoff state. In this case, the filtering output terminal 521 is coupled to the switch 1835, and therefore the driving circuit 1830 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1680 determines to perform a second driving mode, the mode switch 1681 conducts current in the second conductive path through the terminals 1683 and 1684 and the first conductive path through the terminals 1683 and 1685 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 10G:
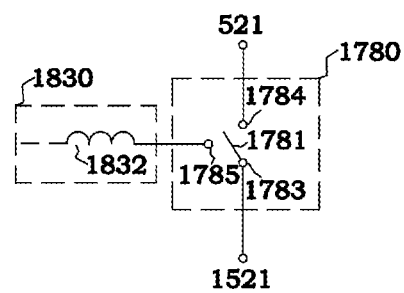

FIG. 10G is a schematic diagram of the mode switching circuit in an LED lamp according to an exemplary embodiment. Referring to FIG. 10G, a mode switching circuit 1780 includes a mode switch 1781 being suitable for use with the driving circuit 1830 in FIG. 9E. Referring to FIGS. 10G and 9E, the mode switch 1781 has three terminals 1783, 1784, and 1785, wherein the terminal 1783 is coupled to the filtering output terminal 521, the terminal 1784 is coupled to the driving output terminal 1521, and the terminal 1785 is coupled to inductor 1832 in the driving circuit 1830.

When the mode switching circuit 1780 determines to perform a first driving mode, the mode switch 1781 conducts current in a first conductive path through the terminals 1783 and 1785, and a second conductive path through the terminals 1783 and 1784 is in a cutoff state. In this case, the filtering output terminal 521 is coupled to the inductor 1832, and therefore the driving circuit 1830 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1780 determines to perform a second driving mode, the mode switch 1781 conducts current in the second conductive path through the terminals 1783 and 1784 and the first conductive path through the terminals 1783 and 1785 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 10H:
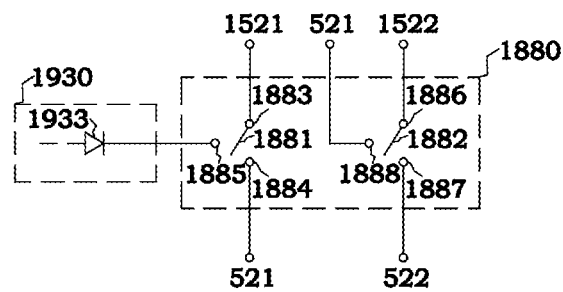

FIG. 10H is a schematic diagram of the mode switching circuit in an LED lamp according to an embodiment. Referring to FIG. 10H, a mode switching circuit 1880 includes two mode switches 1881 and 1882 being suitable for use with the driving circuit 1930 in FIG. 9F. Referring to FIGS. 10H and 9F, the mode switch 1881 has three terminals 1883, 1884, and 1885, wherein the terminal 1883 is coupled to the driving output terminal 1521, the terminal 1884 is coupled to the filtering output terminal 521, and the terminal 1885 is coupled to the freewheeling diode 1933 in the driving circuit 1930. And the mode switch 1882 has three terminals 1886, 1887, and 1888, wherein the terminal 1886 is coupled to the driving output terminal 1522, the terminal 1887 is coupled to the filtering output terminal 522, and the terminal 1888 is coupled to the filtering output terminal 521.

When the mode switching circuit 1880 determines to perform a first driving mode, the mode switch 1881 conducts current in a first conductive path through the terminals 1883 and 1885, and a second conductive path through the terminals 1883 and 1884 is in a cutoff state, and the mode switch 1882 conducts current in a third conductive path through the terminals 1886 and 1888, and a fourth conductive path through the terminals 1886 and 1887 is in a cutoff state. In this case, the driving output terminal 1521 is coupled to the freewheeling diode 1933, and the filtering output terminal 521 is coupled to the driving output terminal 1522. Therefore, the driving circuit 1930 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1880 determines to perform a second driving mode, the mode switch 1881 conducts current in the second conductive path through the terminals 1883 and 1884, and the first conductive path through the terminals 1883 and 1885 is in a cutoff state, and the mode switch 1882 conducts current in the fourth conductive path through the terminals 1886 and 1887, and the third conductive path through the terminals 1886 and 1888 is in a cutoff state. In this case, the driving output terminal 1521 is coupled to the filtering output terminal 521, and the filtering output terminal 522 is coupled to the driving output terminal 1522. Therefore, the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

Figure 10I:
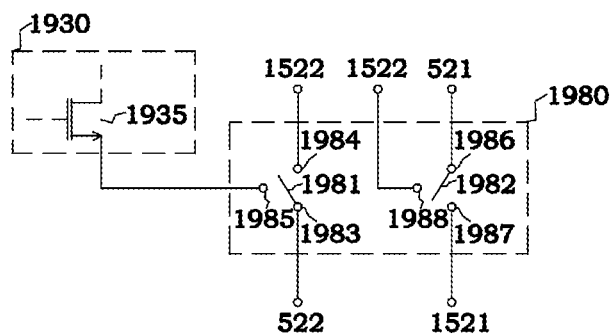

FIG. 10I is a schematic diagram of the mode switching circuit in an LED lamp according to an exemplary embodiment. Referring to FIG. 10I, a mode switching circuit 1980 includes two mode switches 1981 and 1982 being suitable for use with the driving circuit 1930 in FIG. 9F. Referring to FIGS. 10I and 9F, the mode switch 1981 has three terminals 1983, 1984, and 1985, wherein the terminal 1983 is coupled to the filtering output terminal 522, the terminal 1984 is coupled to the driving output terminal 1522, and the terminal 1985 is coupled to switch 1935 in the driving circuit 1930. And the mode switch 1982 has three terminals 1986, 1987, and 1988, wherein the terminal 1986 is coupled to the filtering output terminal 521, the terminal 1987 is coupled to the driving output terminal 1521, and the terminal 1988 is coupled to the driving output terminal 1522.

When the mode switching circuit 1980 determines to perform a first driving mode, the mode switch 1981 conducts current in a first conductive path through the terminals 1983 and 1985, and a second conductive path through the terminals 1983 and 1984 is in a cutoff state, and the mode switch 1982 conducts current in a third conductive path through the terminals 1986 and 1988, and a fourth conductive path through the terminals 1986 and 1987 is in a cutoff state. In this case, driving output terminal 1522 is coupled to the filtering output terminal 521, and the filtering output terminal 522 is coupled to the switch 1935. Therefore the driving circuit 1930 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1980 determines to perform a second driving mode, the mode switch 1981 conducts current in the second conductive path through the terminals 1983 and 1984, and the first conductive path through the terminals 1983 and 1985 is in a cutoff state, and the mode switch 1982 conducts current in the fourth conductive path through the terminals 1986 and 1987, and the third conductive path through the terminals 1986 and 1988 is in a cutoff state. In this case, the driving output terminal 1521 is coupled to the filtering output terminal 521, and the filtering output terminal 522 is coupled to the driving output terminal 1522. Therefore the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

The mode switches described in the above embodiments may each comprise, for example, a single-pole double-throw switch, or comprise two semiconductor switches (such as metal oxide semiconductor transistors), for switching a conductive path on to conduct current while leaving the other conductive path cutoff. Each of the two conductive paths provides a path for conducting the filtered signal, allowing the current of the filtered signal to flow through one of the two paths, thereby achieving the function of mode switching or selection. In some cases, when two switches are used, electronically controlled switches are used and are controlled so that when one is in a conducting state, the other is in a blocking state, and vice versa. With reference to FIG.

5A, when the lamp driving circuit 505 is not present and the LED tube lamp 500 is directly supplied by the AC power supply 508, the mode switching circuit may determine to perform a first driving mode in which the driving circuit (such as driving circuits 1530, 1630, 1730, 1830, and 1930) transforms the filtered signal into a driving signal with a logic level meeting a required logic level to properly drive the LED module to emit light. On the other hand, when the lamp driving circuit 505 is present, the mode switching circuit may determine to perform a second driving mode in which the filtered signal is directly used (e.g., without being passed through another driving circuit of the LED tube lamp 500) to drive the LED module to emit light; or alternatively the mode switching circuit may determine to perform the first driving mode to drive the LED module to emit light, in addition to the lamp driving circuit 505. In some embodiments, the mode switches mentioned above may be user-selectable switches, such as mechanical switches controlled or switched by a user according to the voltage or frequency of the external driving signal received by the LED tube lamp. Or, the mode switches mentioned above may be automatic electronic switches controlled or switched by a controlling circuit which detects the voltage or frequency of the external driving signal received by the LED tube lamp, and determines whether or not to perform a first mode (e.g., using the driving circuit) or a second mode (e.g., bypassing the driving circuit) accordingly. For example, detection of a signal having a voltage and/or frequency below a particular threshold may cause the controlling circuit to select a driving circuit mode, while detection of a signal having a voltage and/or frequency above a particular threshold may cause the controlling circuit to select a driving circuit bypass mode. As such, using a control circuit, the driving mode (e.g., external driving mode/bypass mode vs. internal driving mode) can be selected automatically during operation of the LED tube lamp, for example both upon initial connection to a power source, and if fluctuations in frequency and/or voltage should occur. The present invention is not limited to the above exemplary implementations of the mode switch.

According to certain embodiments, a mode switching circuit (such as mode switching circuit 580, 1680, 1780, 1880, and 1980) for changing a signal path in an LED tube lamp is provided. The mode switching circuit includes at least one switch, which may be referred to as a mode switch, configured to receive a filtered signal as a driving signal to drive an LED module in the LED tube lamp to emit light when a frequency of an external driving signal received by the LED tube lamp is higher than a predefined mode switching frequency. The at least one switch is further configured to cause a driving circuit in the LED tube lamp to receive the filtered signal and to produce another driving signal to drive the LED module to emit light when the frequency of the external driving signal received by the LED tube lamp is lower than the predefined mode switching frequency. For example, in some embodiments, the predefined mode switching frequency is 60 Hz or greater (e.g., for LED tube lamps intended be used for external driving signals having frequencies of 50 Hz or 60 Hz. In other embodiments, the predefined mode switching frequency is 10 kHz or less (e.g., for LED tube lamps intended be used for external driving signals having frequencies of 10 kHz to 50 kHz. In some embodiments, the signal path includes the external driving signal received by the LED tube lamp to pass through, for example, a rectifying circuit, a filtering circuit, the mode switching circuit, and the LED module. In some embodiments, the signal path includes the external driving signal received by the LED tube lamp to pass through, for example, a rectifying circuit, a filtering circuit, the driving circuit, and the LED module.

Figure 11A:
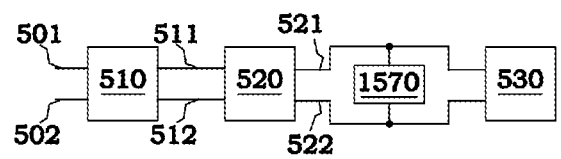
FIG. 11A is a block diagram of an exemplary power supply module in an LED lamp according to some embodiments.

FIG. 11A is a block diagram of a power supply module in an LED tube lamp according to an exemplary embodiment. Compared to that shown in FIG. 9A, the present embodiment comprises a rectifying circuit 510, a filtering circuit 520, and a driving circuit 1530, and further comprises an over voltage protection (OVP) circuit 1570. In this embodiment, a driving circuit 1530 and an LED module 630 compose the LED lighting module 530. The OVP circuit 1570 is coupled to the filtering output terminals 521 and 522 for detecting the filtered signal. The OVP circuit 1570 clamps the logic level of the filtered signal when determining the logic level thereof higher than a defined OVP value. Hence, the OVP circuit 1570 protects the LED lighting module 530 from damage due to an OVP condition.

Figure 11B:
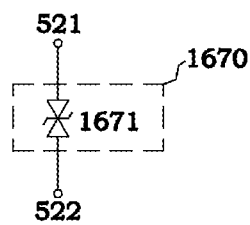
FIG. 11B is a schematic diagram of an over voltage protection (OVP) circuit according to an embodiment.

FIG. 11B is a schematic diagram of an overvoltage protection (OVP) circuit according to an exemplary embodiment. An OVP circuit 1670 comprises a voltage clamping diode 1671, such as zener diode, coupled to the filtering output terminals 521 and 522. The voltage clamping diode 1671 is conducted to clamp a voltage difference at a breakdown voltage when the voltage difference of the filtering output terminals 521 and 522 (i.e., the logic level of the filtered signal) reaches the breakdown voltage. In some embodiments, the breakdown voltage may be in a range of about 40 V to about 100 V. In certain embodiments, the breakdown voltage may be in a range of about 55 V to about 75V.

Figure 12A:
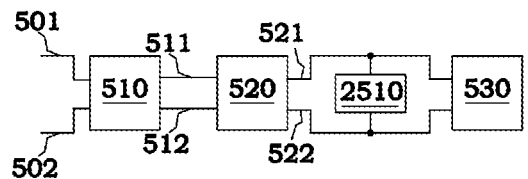
FIGS. 12A and 12B are some block diagrams of an exemplary power supply module in an LED lamp according to some embodiments.

FIG. 12A is a block diagram of a power supply module in an LED tube lamp according to an exemplary embodiment. Compared to that shown in FIG. 9A, the present embodiment comprises a rectifying circuit 510, a filtering circuit 520, and an LED lighting module 530, and further comprises an auxiliary power module 2510. The auxiliary power module 2510 is coupled between the filtering output terminals 521 and 522. The auxiliary power module 2510 detects the filtered signal in the filtering output terminals 521 and 522, and determines whether providing an auxiliary power to the filtering output terminals 521 and 522 based on the detected result. When the supply of the filtered signal is stopped or a logic level thereof is insufficient, i.e., when a drive voltage for the LED module is below a defined voltage, the auxiliary power module provides auxiliary power to keep the LED lighting module 530 continuing to emit light. The defined voltage is determined according to an auxiliary power voltage of the auxiliary power module 2510.

Figure 12B:
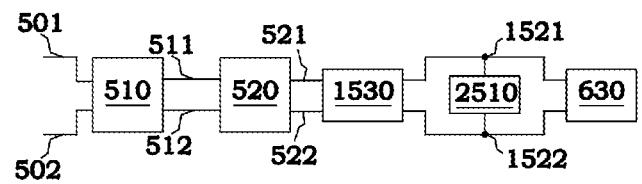

FIG. 12B is a block diagram of a power supply module in an LED tube lamp according to an exemplary embodiment. Compared to that shown in FIG. 12A, the present embodiment comprises a rectifying circuit 510, a filtering circuit 520, and may further include some parts of an LED lighting module 530, and an auxiliary power module 2510, and the LED lighting module 530 further comprises a driving circuit 1530 and an LED module 630. The auxiliary power module 2510 is coupled between the driving output terminals 1521 and 1522. The auxiliary power module 2510 detects the driving signal in the driving output terminals 1521 and 1522, and determines whether to provide an auxiliary power to the driving output terminals 1521 and 1522 based on the detected result. When the driving signal is no longer being supplied or a logic level thereof is insufficient, the auxiliary power module 2510 provides the auxiliary power to keep the LED module 630 continuously light.

Figure 12C:
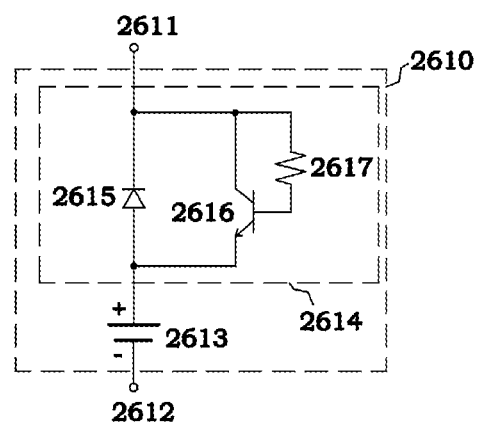
FIG. 12C is a schematic diagram of an auxiliary power module according to an exemplary embodiment.

FIG. 12C is a schematic diagram of an auxiliary power module according to an embodiment. The auxiliary power module 2610 comprises an energy storage unit 2613 and a voltage detection circuit 2614. The auxiliary power module further comprises an auxiliary power positive terminal 2611 and an auxiliary power negative terminal 2612 for being respectively coupled to the filtering output terminals 521 and 522 or the driving output terminals 1521 and 1522. The voltage detection circuit 2614 detects a logic level of a signal at the auxiliary power positive terminal 2611 and the auxiliary power negative terminal 2612 to determine whether releasing outward the power of the energy storage unit 2613 through the auxiliary power positive terminal 2611 and the auxiliary power negative terminal 2612.

In some embodiments, the energy storage unit 2613 is a battery or a supercapacitor. When a voltage difference of the auxiliary power positive terminal 2611 and the auxiliary power negative terminal 2612 (the drive voltage for the LED module) is higher than the auxiliary power voltage of the energy storage unit 2613, the voltage detection circuit 2614 charges the energy storage unit 2613 by the signal in the auxiliary power positive terminal 2611 and the auxiliary power negative terminal 2612. When the drive voltage is lower than the auxiliary power voltage, the energy storage unit 2613 releases the stored energy outward through the auxiliary power positive terminal 2611 and the auxiliary power negative terminal 2612.

The voltage detection circuit 2614 comprises a diode 2615, a bipolar junction transistor (BJT) 2616 and a resistor 2617. A positive end of the diode 2615 is coupled to a positive end of the energy storage unit 2613 and a negative end of the diode 2615 is coupled to the auxiliary power positive terminal 2611. The negative end of the energy storage unit 2613 is coupled to the auxiliary power negative terminal 2612. A collector of the BJT 2616 is coupled to the auxiliary power positive terminal 2611, and an emitter thereof is coupled to the positive end of the energy storage unit 2613. One end of the resistor 2617 is coupled to the auxiliary power positive terminal 2611 and the other end is coupled to a base of the BJT 2616. When the collector of the BJT 2616 is a cut-in voltage higher than the emitter thereof, the resistor 2617 conducts the BJT 2616. When the power source provides power to the LED tube lamp normally, the energy storage unit 2613 is charged by the filtered signal through the filtering output terminals 521 and 522 and the conducted BJT 2616 or by the driving signal through the driving output terminals 1521 and 1522 and the conducted BJT 2616 until that the collector-emitter voltage of the BJT 2616 is lower than or equal to the cut-in voltage. When the filtered signal or the driving signal is no longer being supplied or the logic level thereof is insufficient, the energy storage unit 2613 provides power through the diode 2615 to keep the LED lighting module 530 or the LED module 630 continuously light.

In some embodiments, the maximum voltage of the charged energy storage unit 2613 is at least one cut-in voltage of the BJT 2616 lower than the voltage difference applied between the auxiliary power positive terminal 2611 and the auxiliary power negative terminal 2612. The voltage difference provided between the auxiliary power positive terminal 2611 and the auxiliary power negative terminal 2612 is a turn-on voltage of the diode 2615 lower than the voltage of the energy storage unit 2613. Hence, when the auxiliary power module 2610 provides power, the voltage applied at the LED module 630 is lower (about the sum of the cut-in voltage of the BJT 2616 and the turn-on voltage of the diode 2615). In the embodiment shown in the FIG. 12B, the brightness of the LED module 630 is reduced when the auxiliary power module supplies power thereto. Thereby, when the auxiliary power module is applied to an emergency lighting system or a constant lighting system, the user realizes the main power supply, such as commercial power, is abnormal and then performs necessary precautions therefor.

According to certain embodiments, an LED tube lamp includes: a lamp tube receiving an external driving signal; a rectifying circuit rectifying the external driving signal to produce a rectified signal; a filtering circuit filtering the rectified signal to produce a filtered signal; an LED lighting module comprising a driving circuit and an LED module, the driving circuit receiving the filtered signal to produce a first driving signal in a first driving mode for driving the LED module to emit light; and a mode switching circuit receiving the filtered signal as a second driving signal in a second driving mode for driving the LED module to emit light. Wherein, the first driving mode and the second driving mode are determined based on the external driving signal. In some embodiments, the LED tube lamp is configured to enter the first driving mode when a frequency of the external driving signal is lower than a threshold amount, and the LED tube lamp is configured to enter the second driving mode when the frequency of the external driving signal is higher than the threshold amount. In some embodiments, the threshold amount is a predefined mode switching frequency of 60 Hz or higher. In some embodiments, the threshold amount is a predefined mode switching frequency of 10 kHz or lower. In some embodiments, the filtered signal is input to the mode switching circuit when a frequency of the external driving signal is higher than a predefined mode switching frequency. In some embodiments, the predefined mode switching frequency is lower than 10 KHz. In some embodiments, the predefined mode switching frequency is 60 Hz or higher. For example, an LED tube lamp with the mode switching circuit according to the different embodiments work for two external driving signals, such as, for example, one from a ballast which outputs 400-700V in frequency of 10-50 kHz, and the other one from a commercial power with 100-277V in frequency of 50/60 Hz. The lamp can have a configurable setting such that a threshold value for determining bypass mode versus driving circuit mode can be set to different values. For example, in a case where the LED tube lamp is to be plugged in to a socket receiving a frequency of 10 kHz or higher, a setting for a threshold voltage of 10 kHz can be selected. On the other hand, in a case where the LED tube lamp is to be plugged in to a socket receiving a frequency of 60 Hz or lower, a setting for a threshold voltage of 60 Hz can be selected. In certain embodiments, the mode switching circuit includes a mode switching switch. The mode switching switch may be a single pole double throw switch. Alternatively, the mode switching switch may be an electronic switch. In certain embodiments, the mode switching circuit includes two mode switching switches, each of which including a single pole double throw switch and/or an electronic switch.

The above-mentioned features of the present invention can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:
1. A light-emitting diode (LED) tube lamp, comprising:
   a lamp tube, configured to receive an external driving signal;
   a rectifying circuit, configured to rectify the external driving signal to produce a rectified signal;

a filtering circuit, configured to filter the rectified signal to produce a filtered signal;

an LED lighting module, comprising a driving circuit and an LED module, the driving circuit configured to receive the filtered signal in a first driving mode to produce a first driving signal for driving the LED module to emit light;

a mode switching circuit, configured to receive the filtered signal as a second driving signal in a second driving mode for driving the LED module to emit light, wherein the first driving mode and the second driving mode are determined according to the external driving signal; and an auxiliary power module coupled to the filtering circuit, and configured such that when the first driving signal or the second driving signal is unable to drive the LED module to emit light, the auxiliary power module provides auxiliary power for the LED module to emit light.

2. The LED tube lamp according to claim 1, wherein the LED tube lamp is configured to enter the first driving mode when a frequency of the external driving signal is lower than a threshold amount, and the LED tube lamp is configured to enter the second driving mode when the frequency of the external driving signal is higher than the threshold amount.

3. The LED tube lamp according to claim 2, wherein the threshold amount is a predefined mode switching frequency of 60 Hz or higher.

4. The LED tube lamp according to claim 2, wherein the threshold amount is a predefined mode switching frequency of 10 kHz or lower.

5. The LED tube lamp according to claim 1, wherein the external driving signal includes a voltage difference between a first voltage level and a second voltage level.

6. The LED tube lamp according to claim 1, wherein the mode switching circuit includes a mode switch including a single pole double throw switch and/or an electronic switch.

7. The LED tube lamp according to claim 1, wherein the mode switching circuit includes two mode switches, each of which includes a single pole double throw switch and/or an electronic switch.

8. The LED tube lamp according to claim 1, wherein the mode switching circuit is on a printed circuit board and is electrically connected to the LED module on a bendable circuit sheet in the LED tube lamp, wherein the bendable circuit sheet is disposed below the printed circuit board to be electrically connected to the printed circuit board by soldering.

9. The LED tube lamp according to claim 8, wherein:
the bendable circuit sheet includes a first surface and a second surface;
a plurality of first soldering pads are formed on the first surface of the bendable circuit sheet;
the printed circuit board includes a top surface and a bottom surface;
a plurality of second soldering pads are formed on the top surface of the printed circuit board;
a plurality of third soldering pads respectively corresponding to the plurality of second soldering pads are formed on the bottom surface of the printed circuit board; and
the plurality of first soldering pads on the first surface of the bendable circuit sheet are electrically connected to the plurality of third soldering pads on the bottom surface of the printed circuit board by soldering.

10. The LED tube lamp according to claim 9, wherein the printed circuit board further includes a plurality of through holes correspondingly passing through the plurality of second and third soldering pads on the top surface and the bottom surface of the printed circuit board, wherein at least one of the plurality of through holes is filled with a soldering material to electrically connect to the bendable circuit sheet with the second and third soldering pads during a soldering process.

11. The LED tube lamp according to claim 10, wherein the bendable circuit sheet further includes at least one notch disposed on an edge of an end of the bendable circuit sheet, the at least one notch aligned with the at least one of the plurality of through holes and soldered to the printed circuit board.

12. The LED tube lamp according to claim 1, wherein the auxiliary power module includes an auxiliary power positive terminal, an auxiliary power negative terminal, an energy storage unit, and a voltage detection circuit; the auxiliary power positive and negative terminals are coupled to the LED module; and the voltage detection circuit is configured to detect a level of signal at the auxiliary power positive and negative terminals in order to determine whether to release energy or power of the energy storage unit to the LED module through the auxiliary power positive and negative terminals.

13. A mode switching circuit configured to change a signal path in a light-emitting diode (LED) tube lamp, the mode switching circuit comprising:
at least one switch, configured to receive a filtered signal as a driving signal to drive an LED module in the LED tube lamp to emit light, and when a frequency of an external driving signal received by the LED tube lamp is higher than a predefined mode switching frequency, output the driving signal to the LED module, wherein
the LED tube lamp comprises an auxiliary power module coupled to the mode switching circuit and the LED module, and the auxiliary power module is configured such that when the driving signal is unable to drive the LED module to emit light, the auxiliary power module provides auxiliary power for the LED module to emit light.

14. The mode switching circuit according to claim 13, wherein the predefined mode switching frequency is 10 kHz or lower.

15. The mode switching circuit according to claim 13, wherein the predefined mode switching frequency is 60 Hz or higher.

16. The mode switching circuit according to claim 13, wherein the at least one switch is further configured to cause a driving circuit in the LED tube lamp to receive the filtered signal and to produce another driving signal to drive the LED module to emit light when the frequency of the external driving signal received by the LED tube lamp is lower than the predefined mode switching frequency.

17. The mode switching circuit according to claim 16, wherein the predefined mode switching frequency is higher than 60 Hz.

18. The mode switching circuit according to claim 16, wherein the predefined mode switching frequency is 10 KHz or lower.

19. The mode switching circuit according to claim 13, wherein the external driving signal includes a voltage difference between a first voltage level and a second voltage level.

20. The mode switching circuit according to claim 13, wherein the signal path includes a first path extending from the external driving signal received by the LED tube lamp and including a rectifying circuit, a filtering circuit, the mode switching circuit, and the LED module.

21. The mode switching circuit according to claim 20, wherein the signal path includes a second path extending from the external driving signal received by the LED tube lamp and including the rectifying circuit, the filtering circuit, the LED module, and a driving circuit configured to drive the LED module.

22. The mode switching circuit according to claim 13, wherein the at least one switch includes a mode switch including a single pole double throw switch and/or an electronic switch.

23. The mode switching circuit according to claim 13, wherein the at least one switch includes two mode switches, each of which includes a single pole double throw switch and/or an electronic switch.

24. The mode switching circuit according to claim 13, wherein the mode switching circuit is on a printed circuit board and is electrically connected to the LED module on a bendable circuit sheet in the LED tube lamp, wherein the bendable circuit sheet is disposed below the printed circuit board to be electrically connected to the printed circuit board by soldering.

25. The mode switching circuit according to claim 24, wherein:
    the bendable circuit sheet includes a first surface and a second surface;
    a plurality of first soldering pads are formed on the first surface of the bendable circuit sheet;
    the printed circuit board includes a top surface and a bottom surface;
    a plurality of second soldering pads are formed on the top surface of the printed circuit board;
    a plurality of third soldering pads respectively corresponding to the plurality of second soldering pads are formed on the bottom surface of the printed circuit board; and
    the plurality of first soldering pads on the first surface of the bendable circuit sheet are electrically connected to the plurality of third soldering pads on the bottom surface of the printed circuit board by soldering.

26. The mode switching circuit according to claim 25, wherein the printed circuit board further includes a plurality of through holes correspondingly passing through the plurality of second and third soldering pads on the top surface and the bottom surface of the printed circuit board, wherein at least one of the plurality of through holes is filled with a soldering material to electrically connect to the bendable circuit sheet during a soldering process.

27. The mode switching circuit according to claim 26, wherein the bendable circuit sheet further includes at least one notch disposed on an edge of an end of the bendable circuit sheet, the at least one notch aligned with the at least one of the plurality of through holes and soldered to the printed circuit board.

28. The LED tube lamp according to claim 13, wherein the auxiliary power module includes an auxiliary power positive terminal, an auxiliary power negative terminal, an energy storage unit, and a voltage detection circuit; the auxiliary power positive and negative terminals are coupled to the LED module; and the voltage detection circuit is configured to detect a level of signal at the auxiliary power positive and negative terminals in order to determine whether to release energy or power of the energy storage unit to the LED module through the auxiliary power positive and negative terminals.

29. A light-emitting diode (LED) tube lamp, comprising:
    a lamp tube, configured to receive an external driving signal;
    a filtering circuit, configured to filter the external driving signal to produce a filtered signal based on the external driving signal;
    an LED lighting module, coupled to the filtering circuit, comprising a driving circuit and an LED module;
    a mode switching circuit, coupled to at least one output terminal of the filtering circuit and at least one output terminal of the driving circuit, configured to receive the filtered signal and determine whether to perform a first driving mode or a second driving mode,
    wherein the driving circuit is configured to, when the mode switching circuit is set to the first driving mode allowing the filtered signal to be input to the driving circuit, transform the filtered signal to output a first driving signal for driving the LED module to emit light, and
    wherein the filtering circuit is configured to, when the mode switching circuit is set to the second driving mode allowing the filtered signal to bypass the driving circuit, output the filtered signal as a second driving signal for driving the LED module to emit light; and
    an auxiliary power module coupled to the filtering circuit, and configured such that when the first driving signal or the second driving signal is unable to drive the LED module to emit light, the auxiliary power module provides auxiliary power for the LED module to emit light.

30. The LED tube lamp according to claim 29, wherein the driving circuit is configured to receive the filtered signal in the first driving mode to output the first driving signal when a frequency of the external driving signal received by the LED tube lamp is lower than a predefined mode switching frequency, and
    wherein the mode switching circuit includes at least one switch configured to receive the filtered signal in the second driving mode and to output the second driving signal when a frequency of the external driving signal received by the LED tube lamp is higher than the predefined mode switching frequency.

31. The LED tube lamp according to claim 30, wherein the predefined mode switching frequency is 60 Hz or higher.

32. The LED tube lamp according to claim 30, wherein the predefined mode switching frequency is 10 kHz or lower.

33. The LED tube lamp according to claim 29, wherein the auxiliary power module includes an auxiliary power positive terminal, an auxiliary power negative terminal, an energy storage unit, and a voltage detection circuit; the auxiliary power positive and negative terminals are coupled to the LED module; and the voltage detection circuit is configured to detect a level of signal at the auxiliary power positive and negative terminals in order to determine whether to release energy or power of the energy storage unit to the LED module through the auxiliary power positive and negative terminals.

* * * * *